United States Patent
Hofmann et al.

(10) Patent No.: US 11,905,578 B2
(45) Date of Patent: *Feb. 20, 2024

(54) HYPOEUTECTIC AMORPHOUS METAL-BASED MATERIALS FOR ADDITIVE MANUFACTURING

(71) Applicant: California Institute of Technology, Pasadena, CA (US)

(72) Inventors: Douglas C. Hofmann, Altadena, CA (US); Andre M. Pate, Pasadena, CA (US); Scott N. Roberts, Altadena, CA (US)

(73) Assignee: California Institute of Technology, Pasadena, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/456,867

(22) Filed: Nov. 29, 2021

(65) Prior Publication Data

US 2022/0212254 A1 Jul. 7, 2022

Related U.S. Application Data

(63) Continuation of application No. 15/989,083, filed on May 24, 2018, now Pat. No. 11,185,921.

(Continued)

(51) Int. Cl.
*B22F 10/10* (2021.01)
*B33Y 10/00* (2015.01)
(Continued)

(52) U.S. Cl.
CPC .............. *C22C 16/00* (2013.01); *B22F 10/14* (2021.01); *B22F 10/18* (2021.01); *B22F 10/22* (2021.01);
(Continued)

(58) Field of Classification Search
CPC .......... B22F 10/14; B22F 10/18; B22F 10/22; B22F 10/25; B22F 10/28; B22F 10/34;
(Continued)

(56) References Cited

U.S. PATENT DOCUMENTS 2,190,492 A 2/1940 Staples
2,931,249 A 4/1960 Walton
(Continued)

FOREIGN PATENT DOCUMENTS

CN 101709773 A 5/2010
CN 102563006 A 7/2012
(Continued)

OTHER PUBLICATIONS

Crystallization prediction on laser three-dimensional printing of Zr-based bulk metallic glass Yunzhuo Lu Journal of Non-crystalline solids (Year: 2017).*

(Continued)

*Primary Examiner* — Jenny R Wu

(57) ABSTRACT

Systems and methods for developing tough hypoeutectic amorphous metal-based materials for additive manufacturing, and methods of additive manufacturing using such materials are provided. The methods use 3D printing of discrete thin layers during the assembly of bulk parts from metallic glass alloys with compositions selected to improve toughness at the expense of glass forming ability. The metallic glass alloy used in manufacturing of a bulk part is selected to have minimal glass forming ability for the per layer cooling rate afforded by the manufacturing process, and may be specially composed for high toughness.

19 Claims, 24 Drawing Sheets

Related U.S. Application Data

(60) Provisional application No. 62/510,618, filed on May 24, 2017.

(51) Int. Cl.
  *B33Y 70/00* (2020.01)
  *B33Y 80/00* (2015.01)
  *C22C 16/00* (2006.01)
  *B22F 10/14* (2021.01)
  *B22F 10/18* (2021.01)
  *B22F 10/22* (2021.01)
  *B22F 10/25* (2021.01)
  *B22F 10/28* (2021.01)
  *B22F 10/34* (2021.01)

(52) U.S. Cl.
  CPC .............. *B22F 10/25* (2021.01); *B22F 10/28* (2021.01); *B22F 10/34* (2021.01); *B33Y 10/00* (2014.12); *B33Y 70/00* (2014.12); *B33Y 80/00* (2014.12); *B22F 2301/205* (2013.01); *B22F 2999/00* (2013.01); *C22C 2200/02* (2013.01)

(58) Field of Classification Search
  CPC ........... B22F 2301/205; B22F 2999/00; C22C 16/00; C22C 2200/02; B33Y 10/00; B33Y 70/00; B33Y 80/00; Y02P 10/25
  See application file for complete search history.

(56) References Cited

U.S. PATENT DOCUMENTS

| | | |
|---|---|---|
| 3,119,283 A | 1/1964 | Itzhak |
| 3,435,512 A | 4/1969 | Macrobbie |
| 3,519,444 A | 7/1970 | Brown et al. |
| 3,529,457 A | 9/1970 | Bowers |
| 3,682,606 A | 8/1972 | Anderson et al. |
| 3,986,412 A | 10/1976 | Farley et al. |
| 4,123,737 A | 10/1978 | Hoagland, Jr. |
| RE29,989 E | 5/1979 | Polk et al. |
| 4,173,393 A | 11/1979 | Maurer |
| 4,202,404 A | 5/1980 | Carlson |
| 4,584,036 A | 4/1986 | Taub et al. |
| 4,662,259 A | 5/1987 | Dutina |
| 4,670,636 A | 6/1987 | Taub et al. |
| 4,711,795 A | 12/1987 | Takeuchi et al. |
| 4,749,625 A | 6/1988 | Obayashi et al. |
| 4,783,983 A | 11/1988 | Narasimhan |
| 4,810,314 A | 3/1989 | Henderson et al. |
| 4,812,150 A | 3/1989 | Scott |
| 4,823,638 A | 4/1989 | Ishikawa |
| 4,851,296 A | 7/1989 | Tenhover et al. |
| 4,883,632 A | 11/1989 | Goto et al. |
| 4,935,291 A | 6/1990 | Gunnink |
| 5,005,456 A | 4/1991 | Ballard et al. |
| 5,168,918 A | 12/1992 | Okuda et al. |
| 5,185,198 A | 2/1993 | Lefeber et al. |
| 5,288,344 A | 2/1994 | Peker et al. |
| 5,310,432 A | 5/1994 | Yamanaka et al. |
| 5,417,385 A | 5/1995 | Arnold et al. |
| 5,485,761 A | 1/1996 | Rouverol |
| 5,509,978 A | 4/1996 | Masumoto et al. |
| 5,636,550 A | 6/1997 | Deane |
| 5,722,295 A | 3/1998 | Sakai et al. |
| 5,746,844 A | 5/1998 | Sterett et al. |
| 5,772,803 A | 6/1998 | Peker et al. |
| 5,866,272 A | 2/1999 | Westre et al. |
| 5,896,642 A | 4/1999 | Peker et al. |
| 5,985,204 A | 11/1999 | Otsuka et al. |
| 6,162,130 A | 12/2000 | Masumoto et al. |
| 6,273,322 B1 | 8/2001 | Yamamoto et al. |
| 6,321,738 B1 | 11/2001 | Walsh |
| 6,325,087 B1 | 12/2001 | Tarr |
| 6,620,264 B2 | 9/2003 | Kundig et al. |
| 6,652,679 B1 | 11/2003 | Inoue et al. |
| 6,732,606 B1 | 5/2004 | Zhu et al. |
| 6,771,490 B2 | 8/2004 | Peker et al. |
| 6,843,496 B2 | 1/2005 | Peker et al. |
| 6,887,586 B2 | 5/2005 | Peker et al. |
| 7,052,561 B2 | 5/2006 | Lu et al. |
| 7,073,560 B2 | 7/2006 | Kang et al. |
| 7,075,209 B2 | 7/2006 | Howell et al. |
| 7,323,071 B1 | 1/2008 | Branagan |
| 7,357,731 B2 | 4/2008 | Johnson et al. |
| 7,360,419 B2 | 4/2008 | French et al. |
| 7,497,981 B2 | 3/2009 | Graham et al. |
| 7,500,987 B2 | 3/2009 | Bassler et al. |
| 7,540,929 B2 | 6/2009 | Demetriou et al. |
| 7,552,664 B2 | 6/2009 | Bulatowicz |
| 7,575,040 B2 | 8/2009 | Johnson |
| 7,862,323 B2 | 1/2011 | Micarelli et al. |
| 7,883,592 B2 | 2/2011 | Hofmann et al. |
| 7,896,982 B2 | 3/2011 | Johnson et al. |
| 7,955,713 B2 | 6/2011 | Roebroeks et al. |
| 8,042,770 B2 | 10/2011 | Martin et al. |
| 8,052,923 B2 | 11/2011 | Langlet |
| 8,333,922 B2 | 12/2012 | Skoglund et al. |
| 8,400,721 B2 | 3/2013 | Bertele et al. |
| 8,418,366 B2 | 4/2013 | Wang et al. |
| 8,485,245 B1 | 7/2013 | Prest et al. |
| 8,496,077 B2 | 7/2013 | Nesnas et al. |
| 8,596,106 B2 | 12/2013 | Tang et al. |
| 8,613,815 B2 | 12/2013 | Johnson et al. |
| 8,639,484 B2 | 1/2014 | Wei et al. |
| 8,789,629 B2 | 7/2014 | Parness et al. |
| 8,986,469 B2 | 3/2015 | Khalifa et al. |
| 9,044,805 B2 | 6/2015 | Prest et al. |
| 9,057,120 B2 | 6/2015 | Pham et al. |
| 9,211,564 B2 | 12/2015 | Hofmann |
| 9,328,813 B2 | 5/2016 | Hofmann et al. |
| 9,579,718 B2 | 2/2017 | Hofmann |
| 9,610,650 B2 | 4/2017 | Hofmann et al. |
| 9,689,231 B2 | 6/2017 | Fripp et al. |
| 9,783,877 B2 | 10/2017 | Hofmann et al. |
| 9,791,032 B2 | 10/2017 | Hofmann et al. |
| 9,868,150 B2 | 1/2018 | Hofmann et al. |
| 9,996,053 B2 | 6/2018 | O'keeffe et al. |
| 10,081,136 B2 | 9/2018 | Hofmann et al. |
| 10,151,377 B2 | 12/2018 | Hofmann et al. |
| 10,155,412 B2 | 12/2018 | Parness et al. |
| 10,161,025 B2 | 12/2018 | Poole et al. |
| 10,174,780 B2 | 1/2019 | Hofmann et al. |
| 10,471,652 B2 | 11/2019 | Hofmann et al. |
| 10,487,934 B2 | 11/2019 | Kennett et al. |
| 10,690,227 B2 | 6/2020 | Hofmann et al. |
| 10,883,528 B2 | 1/2021 | Hofmann et al. |
| 10,941,847 B2 | 3/2021 | Hofmann et al. |
| 10,953,688 B2 | 3/2021 | Parness et al. |
| 10,968,527 B2 | 4/2021 | Hofmann et al. |
| 11,014,162 B2 | 5/2021 | Hofmann |
| 11,123,797 B2 | 9/2021 | Hofmann |
| 11,155,907 B2 | 10/2021 | Hofmann et al. |
| 11,168,776 B2 | 11/2021 | Hofmann et al. |
| 11,185,921 B2 | 11/2021 | Hofmann et al. |
| 11,198,181 B2 | 12/2021 | Hofmann et al. |
| 11,400,613 B2 | 8/2022 | Hofmann et al. |
| 11,680,629 B2 | 6/2023 | Hofmann et al. |
| 2002/0053375 A1 | 5/2002 | Hays et al. |
| 2002/0100573 A1 | 8/2002 | Inoue et al. |
| 2002/0184766 A1 | 12/2002 | Kobayashi et al. |
| 2003/0010409 A1 | 1/2003 | Kunze et al. |
| 2003/0052105 A1 | 3/2003 | Nagano et al. |
| 2003/0062811 A1 | 4/2003 | Peker et al. |
| 2003/0209125 A1 | 11/2003 | Bertolet |
| 2004/0035502 A1 | 2/2004 | Kang et al. |
| 2004/0103536 A1 | 6/2004 | Kobayashi et al. |
| 2004/0103537 A1 | 6/2004 | Kobayashi et al. |
| 2004/0154701 A1 | 8/2004 | Lu et al. |
| 2005/0034792 A1 | 2/2005 | Lu et al. |
| 2005/0084407 A1 | 4/2005 | Myrick |
| 2005/0127139 A1 | 6/2005 | Slattery et al. |
| 2005/0172777 A1 | 8/2005 | Olander et al. |
| 2005/0211340 A1 | 9/2005 | Kim et al. |
| 2005/0263932 A1 | 12/2005 | Heugel |

(56) References Cited

U.S. PATENT DOCUMENTS

| | | |
|---|---|---|
| 2006/0105011 A1 | 5/2006 | Sun et al. |
| 2006/0130944 A1 | 6/2006 | Poon et al. |
| 2006/0156785 A1 | 7/2006 | Mankame et al. |
| 2007/0034304 A1 | 2/2007 | Inoue et al. |
| 2007/0039689 A1 | 2/2007 | Petersson et al. |
| 2007/0144621 A1 | 6/2007 | Farmer et al. |
| 2007/0226979 A1 | 10/2007 | Paton et al. |
| 2007/0228592 A1 | 10/2007 | Dunn et al. |
| 2007/0253856 A1 | 11/2007 | Vecchio et al. |
| 2007/0266841 A1 | 11/2007 | Robinson et al. |
| 2007/0270942 A1 | 11/2007 | Thomas |
| 2008/0085368 A1 | 4/2008 | Gauthier et al. |
| 2008/0099175 A1 | 5/2008 | Chu et al. |
| 2008/0121316 A1 | 5/2008 | Duan et al. |
| 2008/0190521 A1 | 8/2008 | Loffler et al. |
| 2008/0304975 A1 | 12/2008 | Clark et al. |
| 2009/0011846 A1 | 1/2009 | Scott |
| 2009/0078370 A1 | 3/2009 | Sklyarevich et al. |
| 2009/0114317 A1 | 5/2009 | Collier et al. |
| 2009/0194205 A1 | 8/2009 | Loffler et al. |
| 2009/0246398 A1 | 10/2009 | Kurahashi et al. |
| 2009/0263582 A1 | 10/2009 | Batchelder |
| 2009/0277540 A1* | 11/2009 | Langlet .................. B22F 12/20 148/522 |
| 2009/0288741 A1 | 11/2009 | Zhang et al. |
| 2010/0313704 A1 | 12/2010 | Wang et al. |
| 2011/0048587 A1 | 3/2011 | Vecchio et al. |
| 2011/0154928 A1 | 6/2011 | Ishikawa |
| 2011/0165339 A1 | 7/2011 | Skoglund et al. |
| 2011/0302783 A1 | 12/2011 | Nagata et al. |
| 2012/0006085 A1 | 1/2012 | Johnson et al. |
| 2012/0067100 A1 | 3/2012 | Stefansson et al. |
| 2012/0073710 A1 | 3/2012 | Kim et al. |
| 2012/0077052 A1 | 3/2012 | Demetriou et al. |
| 2012/0132631 A1 | 5/2012 | Wescott et al. |
| 2012/0133080 A1 | 5/2012 | Moussa et al. |
| 2012/0289946 A1 | 11/2012 | Steger |
| 2013/0009338 A1 | 1/2013 | Mayer |
| 2013/0039708 A1 | 2/2013 | Stenman |
| 2013/0048152 A1 | 2/2013 | Na et al. |
| 2013/0062134 A1 | 3/2013 | Parness et al. |
| 2013/0068527 A1 | 3/2013 | Parness et al. |
| 2013/0112321 A1 | 5/2013 | Poole et al. |
| 2013/0133787 A1 | 5/2013 | Kim |
| 2013/0139964 A1 | 6/2013 | Hofmann et al. |
| 2013/0143060 A1 | 6/2013 | Jacobsen et al. |
| 2013/0255837 A1 | 10/2013 | Peker et al. |
| 2013/0277891 A1 | 10/2013 | Teulet |
| 2013/0280547 A1 | 10/2013 | Brandl et al. |
| 2013/0309121 A1 | 11/2013 | Prest et al. |
| 2013/0316867 A1 | 11/2013 | Kobayashi |
| 2013/0316868 A1 | 11/2013 | Kobayashi |
| 2013/0333814 A1 | 12/2013 | Fleury et al. |
| 2014/0004352 A1 | 1/2014 | McCrea et al. |
| 2014/0010968 A1 | 1/2014 | Prest et al. |
| 2014/0020794 A1 | 1/2014 | Hofmann et al. |
| 2014/0030948 A1 | 1/2014 | Kim et al. |
| 2014/0045680 A1 | 2/2014 | Nakayama et al. |
| 2014/0048969 A1 | 2/2014 | Swanson et al. |
| 2014/0070445 A1 | 3/2014 | Mayer |
| 2014/0083640 A1 | 3/2014 | Waniuk et al. |
| 2014/0090752 A1 | 4/2014 | Waniuk et al. |
| 2014/0093674 A1 | 4/2014 | Hofmann et al. |
| 2014/0141164 A1 | 5/2014 | Hofmann |
| 2014/0163717 A1 | 6/2014 | Das et al. |
| 2014/0202595 A1* | 7/2014 | Hofmann ................ C23C 4/134 148/522 |
| 2014/0203622 A1 | 7/2014 | Yamamoto et al. |
| 2014/0213384 A1 | 7/2014 | Johnson et al. |
| 2014/0224050 A1 | 8/2014 | Hofmann et al. |
| 2014/0227125 A1 | 8/2014 | Hofmann |
| 2014/0246809 A1 | 9/2014 | Hofmann et al. |
| 2014/0293384 A1 | 10/2014 | O'keeffe et al. |
| 2014/0312098 A1 | 10/2014 | Hofmann et al. |
| 2014/0332120 A1 | 11/2014 | Liu et al. |
| 2014/0334106 A1 | 11/2014 | Prest et al. |
| 2014/0342179 A1 | 11/2014 | Hofmann et al. |
| 2014/0348571 A1 | 11/2014 | Prest et al. |
| 2015/0014885 A1 | 1/2015 | Hofmann et al. |
| 2015/0044084 A1 | 2/2015 | Hofmann et al. |
| 2015/0047463 A1 | 2/2015 | Hofmann et al. |
| 2015/0068648 A1 | 3/2015 | Schroers et al. |
| 2015/0075744 A1 | 3/2015 | Hofmann et al. |
| 2015/0158067 A1 | 6/2015 | Kumar et al. |
| 2015/0165693 A1 | 6/2015 | Sagoo et al. |
| 2015/0183169 A1 | 7/2015 | Ehsani |
| 2015/0209094 A1 | 7/2015 | Anderson |
| 2015/0209889 A1 | 7/2015 | Peters et al. |
| 2015/0219572 A1 | 8/2015 | Beuth, Jr. et al. |
| 2015/0284035 A1 | 10/2015 | Reese |
| 2015/0289605 A1 | 10/2015 | Prest et al. |
| 2015/0298443 A1 | 10/2015 | Hundley et al. |
| 2015/0299825 A1 | 10/2015 | Poole et al. |
| 2015/0314566 A1 | 11/2015 | Mattlin et al. |
| 2015/0315678 A1 | 11/2015 | Poole et al. |
| 2015/0323053 A1 | 11/2015 | El-Wardany et al. |
| 2015/0352794 A1 | 12/2015 | Nguyen et al. |
| 2016/0023438 A1 | 1/2016 | Johnson et al. |
| 2016/0175929 A1 | 6/2016 | Colin et al. |
| 2016/0178047 A1 | 6/2016 | Kennett et al. |
| 2016/0186850 A1 | 6/2016 | Hofmann et al. |
| 2016/0233089 A1 | 8/2016 | Zenou et al. |
| 2016/0242877 A1 | 8/2016 | Bernhard |
| 2016/0258522 A1 | 9/2016 | Hofmann et al. |
| 2016/0263937 A1 | 9/2016 | Parness et al. |
| 2016/0265576 A1 | 9/2016 | Hofmann et al. |
| 2016/0299183 A1 | 11/2016 | Lee |
| 2016/0361765 A1 | 12/2016 | Danger et al. |
| 2016/0361897 A1 | 12/2016 | Hofmann et al. |
| 2017/0021417 A1 | 1/2017 | Martin et al. |
| 2017/0050241 A1 | 2/2017 | Thomas et al. |
| 2017/0121799 A1 | 5/2017 | Hofmann et al. |
| 2017/0137955 A1 | 5/2017 | Hofmann et al. |
| 2017/0144225 A1 | 5/2017 | Hofmann |
| 2017/0211168 A1 | 7/2017 | Liu et al. |
| 2017/0226619 A1 | 8/2017 | Hofmann et al. |
| 2017/0276225 A1 | 9/2017 | Takehana et al. |
| 2017/0305003 A1 | 10/2017 | Tannhaeuser |
| 2017/0321790 A1 | 11/2017 | Klassen et al. |
| 2018/0119259 A1 | 5/2018 | Hofmann et al. |
| 2018/0257141 A1 | 9/2018 | Hofmann et al. |
| 2018/0272432 A1 | 9/2018 | Jonsson et al. |
| 2018/0339338 A1 | 11/2018 | Hofmann et al. |
| 2018/0339342 A1 | 11/2018 | Hofmann |
| 2018/0345366 A1 | 12/2018 | Hofmann |
| 2019/0009464 A1 | 1/2019 | Steege |
| 2019/0022923 A1 | 1/2019 | Hofmann et al. |
| 2019/0037721 A1 | 1/2019 | Curran et al. |
| 2019/0126674 A1 | 5/2019 | Parness et al. |
| 2019/0154130 A1 | 5/2019 | Hofmann et al. |
| 2019/0170235 A1 | 6/2019 | Hofmann et al. |
| 2019/0177826 A1 | 6/2019 | Hofmann et al. |
| 2019/0195269 A1 | 6/2019 | Hofmann et al. |
| 2019/0255635 A1 | 8/2019 | Hänni et al. |
| 2019/0314903 A1 | 10/2019 | Haenle et al. |
| 2020/0000595 A1 | 1/2020 | Jones et al. |
| 2020/0278016 A1 | 9/2020 | Hofmann et al. |
| 2020/0278017 A1 | 9/2020 | Hofmann et al. |
| 2020/0282582 A1 | 9/2020 | Hofmann et al. |
| 2020/0284146 A1 | 9/2020 | Yahnker et al. |
| 2020/0318721 A1 | 10/2020 | Hofmann et al. |
| 2020/0406579 A1 | 12/2020 | Hahnlen |
| 2021/0207281 A1 | 7/2021 | Hofmann et al. |
| 2021/0254699 A1 | 8/2021 | Hofmann et al. |
| 2021/0268585 A1 | 9/2021 | Hofmann |
| 2021/0379661 A1 | 12/2021 | Hofmann |
| 2022/0055114 A1 | 2/2022 | Hofmann et al. |

FOREIGN PATENT DOCUMENTS

| | | |
|---|---|---|
| CN | 103153502 A | 6/2013 |
| CN | 203227820 U | 10/2013 |

(56) References Cited

FOREIGN PATENT DOCUMENTS

| | | |
|---|---|---|
| CN | 104117672 A | 10/2014 |
| CN | 104117672 B | 1/2017 |
| DE | 102005014972 A1 | 10/2006 |
| DE | 102009034566 A1 | 2/2011 |
| DE | 102010062089 A1 | 5/2012 |
| DE | 102014003441 A1 | 9/2015 |
| DE | 112018001284 T5 | 11/2019 |
| EP | 0127366 A1 | 5/1984 |
| EP | 1063312 A1 | 12/2000 |
| EP | 1138798 A1 | 10/2001 |
| EP | 1696153 A1 | 8/2006 |
| EP | 1404884 B1 | 7/2007 |
| EP | 1944138 A2 | 7/2008 |
| EP | 2933044 A1 | 10/2015 |
| EP | 3630392 A1 | 4/2020 |
| EP | 3630395 A1 | 4/2020 |
| EP | 3630397 A2 | 4/2020 |
| EP | 3129677 B1 | 9/2021 |
| JP | 60116775 A | 6/1985 |
| JP | 61276762 A | 12/1986 |
| JP | 62227070 A | 10/1987 |
| JP | 09121094 A | 5/1997 |
| JP | 2002045960 A | 2/2002 |
| JP | 2004315340 A | 11/2004 |
| JP | 2004353053 A | 12/2004 |
| JP | 2007040517 A | 2/2007 |
| JP | 2007040518 A | 2/2007 |
| JP | 2007247037 A | 9/2007 |
| JP | 2008115932 A | 5/2008 |
| JP | 2008264865 A | 11/2008 |
| JP | 2010523822 A | 7/2010 |
| JP | 2011045931 A | 3/2011 |
| JP | 2012502178 A | 1/2012 |
| JP | 2012046826 A | 3/2012 |
| JP | 2012162805 A | 8/2012 |
| JP | 2012214826 A | 11/2012 |
| JP | 2013057397 A | 3/2013 |
| JP | 5249932 B2 | 7/2013 |
| JP | 2013238278 A | 11/2013 |
| JP | 2013544648 A | 12/2013 |
| JP | 5611593 B2 | 9/2014 |
| JP | 5723277 B2 | 4/2015 |
| JP | 2018149655 A | 9/2018 |
| JP | 7211976 B2 | 1/2023 |
| KR | 101420176 B1 | 7/2014 |
| KR | 1020190119154 A | 10/2019 |
| KR | 10-2020-0004435 A | 1/2020 |
| KR | 1020200011470 A | 2/2020 |
| KR | 102493233 B1 | 1/2023 |
| WO | 2005077560 A1 | 8/2005 |
| WO | 2006073428 A2 | 7/2006 |
| WO | 2007038882 A1 | 4/2007 |
| WO | 2008058896 A1 | 5/2008 |
| WO | 2008156889 A2 | 12/2008 |
| WO | 2009069716 A1 | 6/2009 |
| WO | 2010027317 A1 | 3/2010 |
| WO | 2011159596 A1 | 12/2011 |
| WO | 2012031022 A2 | 3/2012 |
| WO | 2012083922 A1 | 6/2012 |
| WO | 2012147559 A1 | 11/2012 |
| WO | 2013138710 A1 | 9/2013 |
| WO | 2013141878 A1 | 9/2013 |
| WO | 2013141882 A1 | 9/2013 |
| WO | 2014004704 A1 | 1/2014 |
| WO | 2014012113 A2 | 1/2014 |
| WO | 2014058498 A3 | 4/2014 |
| WO | 2015042437 A1 | 3/2015 |
| WO | 2015156797 A1 | 10/2015 |
| WO | 2016116562 A1 | 7/2016 |
| WO | 2018165662 A1 | 9/2018 |
| WO | 2018218077 A1 | 11/2018 |
| WO | 2018218247 A1 | 11/2018 |
| WO | 2018223117 A2 | 12/2018 |
| WO | 2018223117 A3 | 1/2019 |

OTHER PUBLICATIONS

Tough Hypoeutectic Zr-based bulk metallic glasses Yoshihiko Yokoyama (Year: 2011).*
Cheung et al., Thermal and mechanical properties of Cu—Zr—Al bulk metallic glasses, Journal of Alloys and Compounds, vol. 434-435, 2007, pp. 71-74, doi: 10.1016/j.jallcom.2006.08.109.
Davis, "Gear Materials, Properties, and Manufacture", ASM International, Sep. 2005, Chapters 1-3, pp. 1-76.
Jiang et al., "Microstructure evolution and mechanical properties of $Cu_{46}Zr_{47}Al_7$ bulk metallic glass composite containing CuZr crystallizing phases", Materials Science and Engineering A, vol. 467, 2007, pp. 139-145, doi: 10.1016/j.mesa.2007.02.093.
Lee et al., "Crystallization-Induced Plasticity of Cu—Zr Containing Bulk Amorphous Alloys", Acta Materialia, 2006, vol. 54, pp. 349-355.
Yokoyama et al., "Relations between the Thermal and Mechanical Properties of Cast Zr—Tm—Al (Tm: Cu, Ni, or Co) Bulk Glassy Alloys", Materials Transactions, vol. 48, No. 7, Jun. 25, 2007, pp. 1846-1849.
Extended European Search Report for European Application No. 14889035.3, Search completed Dec. 4, 2017, dated Dec. 13, 2017, 10 Pgs.
Extended European Search Report for European Application No. 18806700.3, Search completed Oct. 20, 2020, dated Oct. 28, 2020, 7 Pgs.
Extended European Search Report for European Application No. 18809486.6, Search completed Sep. 30, 2030, dated Oct. 12, 2020, 7 Pgs.
Extended Search Report for European Application No. 18805898.6, Search completed Jan. 20, 2021 , dated Jan. 28, 2021, 13 Pgs.
International Preliminary Report on Patentability for International Application PCT/US2018/035813, Report dated Dec. 3, 2019, dated Dec. 12, 2019, 9 Pgs.
International Preliminary Report on Patentability for International Application PCT/US2013/047950, dated Dec. 31, 2014, dated Jan. 8, 2015, 7 Pgs.
International Preliminary Report on Patentability for International Application PCT/US2013/050614, dated Jan. 20, 2015, dated Jan. 29, 2015, 9 Pgs.
International Preliminary Report on Patentability for International Application PCT/US2014/033510, dated Oct. 12, 2016, dated Oct. 20, 2016, 9 Pgs.
International Preliminary Report on Patentability for International Application PCT/US2014/056615, dated Mar. 22, 2016, dated Mar. 31, 2016, 11 Pgs.
International Preliminary Report on Patentability for International Application PCT/US2018/022020, Report dated Sep. 10, 2019, dated Sep. 19, 2019, 10 Pgs.
International Preliminary Report on Patentability for International Application PCT/US2018/034481, Report dated Nov. 26, 2019, dated Dec. 5, 2019, 17 Pgs.
International Preliminary Report on Patentability for International Application PCT/US2018/034924, Report dated Nov. 26, 2019, dated Dec. 5, 2019, 13 Pgs.
International Search Report and Written Opinion for International Application No. PCT/US2013/050614, Completed May 7, 2014, dated May 7, 2014, 12 pgs.
International Search Report and Written Opinion for International Application No. PCT/US2018/022020, Search completed Jul. 2, 2018, dated Jul. 3, 2018, 12 Pgs.
International Search Report and Written Opinion for International Application No. PCT/US2018/034481, Search completed Sep. 10, 2018, dated Sep. 10, 2018, 19 Pgs.
International Search Report and Written Opinion for International Application No. PCT/US2018/034924, Search completed Sep. 18, 2018, dated Sep. 19, 2018, 15 Pgs.
International Search Report and Written Opinion for International Application No. PCT/US2018/035813, Search completed Dec. 12, 2018, dated Dec. 12, 2018, 11 Pgs.
International Search Report and Written Opinion for International Application PCT/US2013/047950, completed Oct. 8, 2013, dated Oct. 10, 2013, 9 pgs.

(56) References Cited

OTHER PUBLICATIONS

International Search Report and Written Opinion for International Application PCT/US2014/033510, completed Jan. 8, 2015, dated Jan. 8, 2015, 11 Pgs.
International Search Report and Written Opinion for International Application PCT/US2014/056615, completed Dec. 29, 2014, dated Dec. 30, 2014, 13 Pgs.
"Corrosion of Titanium and Titanium Alloys", Total Materia., printed Feb. 16, 2016 from http://www.totalmateria.com/Article24.htm, published Sep. 2001, 4 pgs.
"Gear", Dictionary.com. Accessed Aug. 30, 2016.
"Group 4 element", Wikipedia. https://en.wikipedia.org/wiki/Group_4_element. Published Jun. 11, 2010. Accessed Aug. 24, 2016.
"Harmonic Drive", Wikipedia, printed Feb. 20. 2014, 4 pgs.
"Harmonic Drive AG", website, printed from http://harmoncdrive.aero/?idcat=471, Feb. 20, 2014, 2 pgs.
"Harmonic Drive Polymer GmbH", printed Feb. 20, 2014 from http://www.harmonicdrive.de/English/the-company/subsidiaries/harmonic-drive-polymer-gmbh.html, 1 pg.
"Introduction to Thermal Spray Processing", ASM International, Handbook of Thermal Spray Technology (#06994G), 2004, 12 pgs.
Abdeljawad et al., "Continuum Modeling of Bulk Metallic Glasses and Composites", Physical Review Letters, vol. 105, 205503, Sep. 17, 2010, pp. 125503-1-125503-4, DOI: 10.1103/PhysRevLett.15.125503.
Abrosimova et al., "Crystalline layer on the surface of Zr-based bulk metallic glasses", Journal of Non-Crystalline solids, Mar. 6, 2001, vol. 288, pp. 121-126.
Adharapurapu et al., "Fracture of Ti—Al3Ti metal-intermetallic laminate composites: Effects of lamination on resistance-curve behavior", Metallurgical and Materials Transactions A, Nov. 2005, vol. 36A, 3217-3236.
An et al., "Synthesis of Single-Component Metallic Glasses by Thermal Spray of Nanodroplets on Amorphous Substrates", Applied Physics Letters, Jan. 26, 2012, vol. 100, pp. 041909-1-041909-4, doi:10.1063/1.3675909.
Anstis et al., "A Critical Evaluation of Indentation Techniques for Measuring Fracture Toughness: I, Direct Crack Measurements", Journal of American Ceramic Society, Sep. 1, 1981, vol. 64, No. 8, pp. 533-538.
Ashby et al., "Metallic glasses of structural materials", Scripta Materialia, Feb. 2006, vol. 54, pp. 321-326, doi:10.1016/j.scriptamat.2005.09.051.
Bakkal, "Sliding tribological characteristics of Zr-based bulk metallic glass under lubricated conditions", Intermetallics, Mar. 19, 2010, vol. 18, pp. 1251-1253, doi:10.1016/j.intermet.2010.02.003.
Bardt et al., "Micromolding three-dimensional amorphous metal structures", J. Mater. Res, Feb. 2007, vol. 22, No. 2, pp. 339-343, DOI: 10.1557/JMR.2007.0035.
Basu et al., "Laser surface coating of Fe—Cr—Mo—Y—B—C bulk metallic glass composition on AISI 4140 steel", Surface & Coatings Technology, Mar. 15, 2008, vol. 202, pp. 2623-2631, doi:10.1016/j.surfcoat.2007.09.028.
Berger, "A Survey of Additive Manufacturing Processes Applied on the Fabrication of Gears", 1st International Conference on Progress in Additive Manufacturing (Pro-AM 2014), May 26-28, 2014, pp. 315-320, doi: 10.3850/978-981-09-0446-3_010.
Boopathy et al., "Near-threshold fatigue crack growth in bulk metallic glass composites", J. Mater. Res., vol. 24, No. 12, pp. 3611-3619, Dec. 2009, DOI: 10.1557/fmr.2009.0439, Dec. 2009.
Bordeenithikasem et al., "Glass forming ability, flexural strength, and wear properties of additively manufactured Zr-based bulk metallic glasses produced through laser powder bed fusion", Additive Manufacturing, Mar. 21, 2018, vol. 21, pp. 312-317, https://doi.org/10.1016/j.addma.2018.03.023.
Branagan et al., "Wear Resistant Amorphous and Nanocomposite Steel Coatings", Met. Mater. Trans. A, Apr. 26, 2001, 32A; Idaho National Engineering and Environmental Laboratory, DOI 10.1007/s11661-001-0051-8, 15 pgs.
Byrne et al., "Bulk Metallic Glasses", Science, Jul. 25, 2008, vol. 321, pp. 502-503, doi:10.1126/science.1158864.
Cadney et al., "Cold Gas Dynamic Spraying as a Method for Freeforming and Joining Materials", Science Direct, Surface & Coatings Technology, Mar. 15, 2008, vol. 202, pp. 2801-2806, available online Oct. 17, 2007, doi: 10.1016/j.surfcoat.2007.10.010.
Calin et al., "Improved mechanical behavior of Cu—Ti-based bulk metallic glass by in situ formation of nanoscale precipitates", Scripta Materialia, Mar. 17, 2003, vol. 48, pp. 653-658.
Chen et al., "Elastic Constants, Hardness and Their Implications to Flow Properties of Metallic Glasses", Journal of Non-crystalline Solids, Sep. 1, 1975, vol. 18, pp. 157-171.
Chen et al., "Formation of Micro-Scale Precision Flexures via Molding of Metallic Glass", Proceeding of the Annual Meeting of the ASPE, Monterey, CA, 2006, pp. 283-286.
Chen et al., "Influence of laser surface melting on glass formation and tribological behaviors of $Zr_{55}Al_{10}Ni_5Cu_{30}$ alloy", J. Mater Res. Oct. 28, 2011, vol. 26, No. 20, pp. 2642-2652, DOI: 10.1157/jmr.2011.278.
Cheng et al., "Characterization of Mechanical Properties of Fecrbsimnnby Metallic Glass Coatings", J Mater Sci., Apr. 16, 2009, vol. 44, pp. 3356-3363, DOI: 10.1007/s10853-009-3436-5.
Cheng et al., "Correlation of the microstructure and mechanical properties of Zr-based in-situ bulk metallic glass matrix composites", Intermetallics, Sep. 24, 2010, vol. 18, Issue 12, pp. 2425-2430, doi:10.1016/j.intermet.2010.08.040.
Choi et al., "Tribological behavior of the kinetic sprayed $Ni_{59}Ti_{16}Zr_{20}Si_2Sn_3$ bulk metallic glass", Journal of Alloys and Compounds, May 31, 2007, vol. 434-435, pp. 64-67, doi:10.1016/j.jallcom.2006.08.283.
Conner et al., "Shear band spacing under bending of Zr-based metallic glass plates", Acta Materialia, Jan. 27, 2004, vol. 52, pp. 2429-2434, doi:10.1016/j.actamat.2004.01.034.
Conner et al., "Shear bands and cracking of metallic glass plates in bending", Journal of Applied Physics, Jul. 15, 2003, vol. 94, No. 2, pp. 904-911, DOI: 10.1063/1.1582555.
Dai et al., "A new centimeter-diameter Cu-based bulk metallic glass", Scripta Materialia, Jan. 20, 2006, vol. 54, pp. 1403-1408, doi:10.1016/j.scriptamat.2005.11.077.
Dai et al., "High-performance bulk Ti—Cu—Ni—Sn—Ta nanocomposites based on a dendrite-eutectic microstructure", Journal of Materials Research, Sep. 2004, vol. 19, No. 9, pp. 2557-2566, DOI: 10.1557/JMR.2004.0332.
Davis, "Hardness/Strength Ratio of Metallic Glasses", Scripta Metallurgica, Feb. 18, 1975, vol. 9, pp. 431-436.
De Beer et al., "Surface Folds Make Tears and Chips", Physics, Sep. 4, 2012, vol. 100, 3 pgs., DOI: 10.1103/Physics.5.100.
Demetriou et al., "Glassy steel optimized for glass-forming ability and toughness", Applied Physics Letters, Jul. 31, 2009, vol. 95; pp. 041907-1-041907-3; http:/idx.doi.org/10.1063/1.3184792.
Dislich et al., "Amorphous and Crystalline Dip Coatings Obtained from Organometallic Solutions: Procedures, Chemical Processes and Products", Metallurgical and Protective Coatings, Mar. 6, 1981, vol. 77, pp. 129-139.
Duan et al., "Lightweight Ti-based bulk metallic glasses excluding late transition metals", Scripta Materialia, Mar. 2008, vol. 58, pp. 465-468, doi:10.1016/h,scriptamat.2007.10.040.
Duan et al., "Tribological properties of Zr41.25Ti13.75Ni10Cu12.5Be22.5 bulk metallic glasses under different conditions", Journal of Alloys and Compounds, Mar. 2, 2012, vol. 528, pp. 74-78, doi:10.1016/j.jallcom.2012.02.104.
Fan et al., "Metallic glass matrix composite with precipitated ductile reinforcement", Applied Physics Letters, Aug. 5, 2002, vol. 81, Issue 6, pp. 1020-1022, DOI: 10.1063/1.1498864.
Fleury et al., "Tribological properties of bulk metallic glasses", Materials Science and Engineering, Jul. 2004, vol. A375-377, pp. 276-279, doi:10.1016/j.msea.2003.10.065.
Fornell et al., "Enhanced mechanical properties and in vitro corrosion behavior of amorphous and devitrified Ti40Zr10Cu38Pd12 metallic glass", Journal of the Mechanical Behavior of Biomedical Materials, May 27, 2011, vol. 4, pp. 1709-1717, doi:10.1016/j.jmbbm.2011.05.028.

(56) References Cited

OTHER PUBLICATIONS

Fu et al., "Sliding behavior of metallic glass Part I. Experimental investigations", Wear, Oct. 2001, vol. 250, pp. 409-419.
Ganesan et al., "Bonding Behavior Studies of Cold Sprayed Copper Coating on the PVC Polymer Substrate", Surface & Coatings Technology, Jul. 10, 2012, vol. 207, pp. 262-269.
Garrett et al., "Effect of microalloying on the toughness of metallic glasses", Applied Physics Letter, Dec. 12, 2012, vol. 101, 241913-1-241913-3, http://dx.doi.org/10.1063/1.47699997.
Gleason Corporation, "Gear Product News", Introducing genesis, the Next Generation in Gear Technology, Apr. 2006, 52 pgs.
Gloriant, "Microhardness and abrasive wear resistance of metallic glasses and nanostructured composite materials", Journal of Non-Crystalline Solids, Feb. 2003, vol. 316, pp. 96-103.
Greer, "Partially or fully devitrified alloys for mechanical properties", Materials and Science and Engineering, May 31, 2001, vol. A304, pp. 68-72.
Greer et al., "Wear resistance of amorphous alloys and related materials", International Materials Reviews, Apr. 1, 2002, vol. 47, No. 2, pp. 87-112, DOI: 10.1179/095066001225001067.
Gu et al., "Selective Laser Melting Additive Manufacturing of Ti-Based Nanocomposites: The Role of Nanopowder", Metallurgical and Materials Transactions A, Jan. 2014, vol. 45, pp. 464-476, DOI: 10.1007/s11661-013-1968-4.
Guo et al., "Tensile ductility and necking of metallic glass", Nature Materials, Oct. 2007, vol. 6, pp. 735-739, published online Aug. 19, 2007, doi:10.1038/nmat1984.
Ha et al., "Tensile deformation behavior of two Ti-based amorphous matrix composites containing ductile β dendrites", Materials Science and Engineering: A, May 28, 2012, vol. 552, pp. 404-409, http://dx.doi.org/10.1016/j.msea.2012.05.061.
Hale, "Principles and Techniques for Designing Precision Machines", Ph.D. Thesis, Feb. 1999, 493 pgs.
Harmon et al., "Anelastic to Plastic Transition in Metallic Glass-Forming Liquids", Physical Review Letters, Sep. 28, 2007, vol. 99, 135502-1-135502-4, DOI: 10.1103/PhysRevLett.99.135502.
Haruyama et al., "Volume and enthalpy relaxation in $Zr_{55}Cu_{30}Ni_{5}Al_{10}$ bulk metallic glass", Acta Materialia, Mar. 2010, vol. 59, pp. 1829-1836, doi:10.1016/jactamat.2009.11.025.
Hays et al., "Microstructure Controlled Shear Band Pattern Formation and Enhanced Plasticity of Bulk Metallic Glasses Containing in situ Formed Ductile Phase Dendrite Dispersions", Physical Review Letters, Mar. 27, 2000, vol. 84, pp. 2901-2904.
He et al., "Novel Ti-base nanostructure-dendrite composite with enhanced plasticity", Nature Materials, Jan. 2003, Published Dec. 8, 2002, vol. 2, pp. 33-37, doi: 10.1038/nmat792.
Hejwowski et al., "A Comparative Study of Electrochemical Properties of Metallic Glasses and Weld Overlay Coatings", Vacuum, Feb. 2013, vol. 88, pp. 118-123, doi:10.1016/j.vacuum.2012.02.031.
Hofmann, "Bulk Metallic Glasses and Their Composites: A Brief History of Diverging Fields", Journal of Materials, Jan. 2013, vol. 2013, 7 pgs., http://dx.doi.org/10.1155/2013/517904.
Hofmann, "Shape Memory Bulk Metallic Glass Composites", Science, Sep. 10, 2010, vol. 329, pp. 1294-1295, doi:10.1126/science.1193522.
Hofmann et al., "Designing metallic glass matrix composites with high toughness and tensile ductility", Nature Letters, Feb. 28, 2008, vol. 451, pp. 1085-1090, doi:10.1038/nature06598.
Hofmann et al., "Development of tough, low-density titanium-based bulk metallic glass matrix composites with tensile ductility", PNAS, Dec. 23, 2008, vol. 105, pp. 20136-20140, www.pnas.org/cgi/doi/10.1073/pnas.0809000106.
Hofmann et al., "Improving Ductility in Nanostructured Materials and Metallic Glasses: Three Laws", Material Science Forum, 2010, vols. 633-634, pp. 657-663, published online Nov. 19, 2009, doi:10.4028/www.scientific.net/MSF.633-634.657.
Hofmann et al., "Semi-solid Induction Forging of Metallic Glass Matrix Composites", JOM, Dec. 2009, vol. 61, No. 12, pp. 11-17, plus cover.

Hong et al., "Microstructural Characteristics of High-Velocity Oxygen-Fuel (HVOF) Sprayed Nickel-Based Alloy Coating", Journal of Alloys and Compounds, Jul. 26, 2013, vol. 581, pp. 398-403, http://dx.doi.org/10.1016/j.jallcom.2013.07.109.
Hu et al., "Crystallization Kinetics of the Cu47.5Zr74.5A15 Bulk Metallic Glass under Continuous and Iso-thermal heating", Applied Mechanics and Materials, Sep. 8, 2011, vols. 99-100, pp. 1052-1058, doi:10.4028/www.scientific.net/AMM.99-100.1052.
Huang et al., "Dendritic microstructure in the metallic glass matrix composite Zr56Ti14Nb5Cu7Ni6Be12", Scripta Materialia, Mar. 29, 2005, vol. 53, pp. 93-97, doi:10.1016/j.scriptamat.2005.03.005.
Huang et al., "Fretting wear behavior of bulk amorphous steel", Intermetallics, Jun. 12, 2011, vol. 19, pp. 1385-1389, doi:10.1016/j.intermet.2011.04.014.
Inoue et al., "Cobalt-based bulk glassy alloy with ultrahigh strength and soft magnetic properties", Nature Materials, Oct. 21, 2003, vol. 2, pp. 661-663, doi:10.1038/nmat982.
Inoue et al., "Development and applications of late transition metal bulk metallic glasses", Bulk Metallic Glasses, pp. 1-25, 2008.
Inoue et al., "Developments and applications of bulk metallic glasses", Reviews on Advanced Materials Science, Feb. 28, 2008, vol. 18, pp. 1-9.
Inoue et al., "Preparation of 16 mm Diameter Rod of Amorphous $Zr_{65}Al_{7.5}Ni_{10}Cu_{17.5}$ Alloy", Material Transactions, JIM, 1993, vol. 34, No. 12, pp. 1234-1237.
Inoue et al., "Recent development and application products of bulk glassy alloys", Acta Materialia, Jan. 20, 2011, vol. 59, Issue 6, pp. 2243-2267, doi.10.1016/j.actamat.2010.11.027.
Ishida et al., "Wear Resistivity of Super-Precision Microgear Made of Ni-Based Metallic Glass", Materials Science and Engineering, Mar. 25, 2007, vol. A449-451, pp. 149-154, doi:10.1016/j.msea.2006.02.300.
Jiang et al., "Low-Density High-Strength Bulk Metallic Glasses and Their Composites: A Review", Advanced Engineering Materials, Nov. 19, 2014, pp. 1-20, DOI: 10.1002/adem.201400252.
Jiang et al., "Tribological Studies of a Zr-Based Glass-Forming Alloy with Different States", Advanced Engineering Materials, Sep. 14, 2009, vol. 1, No. 11, pp. 925-931, DOI: 10.1002/adem.200900184.
Johnson et al., "Quantifying the Origin of Metallic Glass Formation", Nature Communications, Jan. 20, 2016, vol. 7, 10313, 7 pgs., doi: 10.1038/ncomms10313.
Jung et al., "Fabrication of Fe-based bulk metallic glass by selective laser melting: A parameter study", Materials and Design, Jul. 30, 2015, vol. 86, pp. 703-708, http://dx.doi.org/10.1016/j. matdes.2015.07.145.
Kahraman et al., "A Feasibility Study on Development of Dust Abrasion Resistant Gear Concepts for Lunar Vehicle Gearboxes", NASA Grant NNX07AN42G Final Report, Mar. 11, 2009, 77 pgs.
Kim et al., "Amorphous Phase Formation of Zr-Based Alloy Coating by HVOF Spraying Process", Journal of Materials Science, Jan. 1, 2001, vol. 36, pp. 49-54.
Kim et al., "Design and synthesis of Cu-based metallic glass alloys with high glass forming ability", Journal of Metastable and Nanocrystalline Materials, Sep. 1, 2005, vols. 24-25, pp. 93-96, doi:10.4028/www.scientific.net/JMNM.24-25.93.
Kim et al., "Enhancement of Metallic Glass Properties of Cu-Based BMG Coating by Shroud Plasma Spraying", Science Direct, Surface & Coatings Technology, Jan. 25, 2011, vol. 205, pp. 3020-3026, doi:10.1016/j.surfcoat.2010.11.012.
Kim et al., "Oxidation and Crystallization Mechanisms in Plasma-Sprayed Cu-Based Bulk Metallic Glass Coatings", Acta Materialia., Feb. 1, 2010, vol. 58, pp. 952-962, doi:10.1016/j.actamat.2009.10.011.
Kim et al., "Production of $Ni_{65}Cr_{15}P_{16}B_{4}$ Metallic Glass-Coated Bipolar Plate for Fuel Cell by High Velocity Oxy-Fuel (HVOF) Spray Coating Method", The Japan Institute of Metals, Materials Transactions, Aug. 25, 2010, vol. 51, No. 9. pp. 1609-1613.
Kim et al., "Realization of high tensile ductility in a bulk metallic glass composite by the utilization of deformation-induced martensitic transformation", Scripta Materialia, May 3, 2011, vol. 65, pp. 304-307, doi:10.1016/j.scriptamat.2011.04.037.

(56) References Cited

OTHER PUBLICATIONS

Kim et al., "Weldability of $Cu_{54}Zr_{22}Ti_{18}Ni_6$ bulk metallic glass by ultrasonic welding processing", Materials Letters, May 17, 2014, vol. 130, pp. 160-163, http://dx.doi.org/10.1016/j.matlet.2014.05.056.

Kobayashi et al., "Fe-Based Metallic Glass Coatings Produced by Smart Plasma Spraying Process", Materials Science and Engineering, 2007, vol. B148, pp. 110-113, doi:10.1016/j.mseb.2007.09.035.

Kobayashi et al., "Mechanical Property of Fe-Base Metallic Glass Coating Formed by Gas Tunnel Type Plasma Spraying", ScienceDirect, Surface & Coatings Technology, (2007), 6 pgs., doi:10.1016/j.surfcoat.2007.09.011.

Kobayashi et al., "Property of Ni-Based Metallic Glass Coating Produced by Gas Tunnel Type Plasma Spraying", International Plasma Chemistry Society, ISPC 20, 234, Philadelphia, USA, Jul. 24, 2011, Retrieved from: http://www.ispc-conference.org/ispcproc/ispc20/234.pdf.

Kong et al., "Effect of Flash Temperature on Tribological Properties of Bulk Metallic Glasses", Tribol. Lett., Apr. 25, 2009, vol. 35, pp. 151-158, DOI 10.1007/s11249-009-9444-4.

Kozachkov et al., "Effect of cooling rate on the volume fraction of B2 phases in a CuZrAlCo metallic glass matrix composite", Intermetallics, Apr. 19, 2013, vol. 39, pp. 89-93, http://dx.org/10.1016/jintermet.2013.03.017.

Kuhn et al., "Microstructure and mechanical properties of slowly cooled Zr—Nb—Cu—Ni—Al composites with ductile bcc phase", Materials Science and Engineering: A, Jul. 2004, vol. 375-377, pp. 322-326, doi:10.1016/j.msen.2003.10.086.

Kuhn et al., "ZrNbCuNiAl bulk metallic glass matrix composites containing dendritic bcc phase precipitates", Applied Physics Letters, Apr. 8, 2002, vol. 80, No. 14, pp. 2478-2480.

Kumar et al., "Bulk Metallic Glass: The Smaller the Better", Advanced Materials, Jan. 25, 2011, vol. 23, pp. 461-476, doi:10.1002/adma.201002148.

Kumar et al., "Embrittlement of Zr-based Bulk Metallic Glasses", Science Direct, Acta Materialia, 2009, vol. 57, pp. 3572-3583, available online May 11, 2009, doi:10.1016/j.actamat.2009.04.16.

Kwon et al., "Wear Behavior of Fe-Based Bulk Metallic Glass Composites", Journal of Alloys and Compounds, Jul. 14, 2011, vol. 509S, pp. S105-S108, doi:10.1016/j.jallcom.2012.12.108.

Launey et al., "Fracture toughness and crack-resistance curve behavior in metallic glass-matrix composites", Applied Physics Letters, Jun. 18, 2009, vol. 94, pp. 241910-1-241910-3, DOI: 10.1063/1.3156026.

Launey et al., "Solution to the Problem of the Poor Cyclic Fatigue Resistance of Bulk Metallic Glasses", PNAS Early Edition, pp. 1-6, Jan. 22, 2009, www.pnas.org/cgi/doi/10.1073/pnas.0900740106.

Lee et al., "Effect of a controlled volume fraction of dendritic phases on tensile and compressive ductility in La-based metallic glass matrix composites", Acta Materialia, vol. 52, Issue 14, Jun. 17, 2004, pp. 4121-4131, doi:10.1016/j.actamat.2004.05.025.

Lee et al., "Nanomechanical properties of embedded dendrite phase and its influence on inelastic deformation of $Zr_{55}Al_{10}Ni_5Cu_{30}$ glassy alloy", Materials Science and Engineering A, Mar. 25, 2007, vol. 375, pp. 945-948, doi:10.1016/j.msea.2006.02.014.

Li et al., "Selective laser melting of Zr-based bulk metallic glasses: Processing, microstructure and mechanical properties", Materials and Design, Sep. 21, 2016, vol. 112, pp. 217-226, http://dx.doi.org/10.1016/j.matdes.2016.09.071.

Li et al., "Wear Behavior of Bulk Zr41Ti14Cu12.5Ni10Be22.5 Metallic Glasses", J. Mater. Res., Aug. 2002, vol. 17, No. 8, pp. 1877-1880.

Lillo et al., "Microstructure, Processing, Performance Relationships for High Temperature Coatings", U.S. Department of Energy, Office of Fossil Energy, under DOE Idaho Operations Office, Contract DE-AC07-05ID14517; Jul. 1, 2008, 22nd Annual Conference on Fossil Energy Materials, Pittsburgh, U.S., 8 pgs.

Lin et al., "Designing a toxic-element-free Ti-based amorphous alloy with remarkable supercooled liquid region for biomedical application", Intermetallics, Jul. 9, 2014, vol. 55, pp. 22-27, http://dx.doi.org/10.1016/j.intermet.2014.07.003.

List et al., "Impact Conditions for Cold Spraying of Hard Metallic Glasses", Journal of Thermal Spray Technology, Jun. 1, 2012, vol. 21, No. 3-4, pp. 531-540, DOI: 10.1007/s11666-012-9750-5.

Liu et al., "Influence of Heat Treatment on Microstructure and Sliding Wear of Thermally Sprayed Fe-Based Metallic Glass Coatings", Tribol. Lett., Mar. 4, 2012, vol. 46, pp. 131-138, DOI: 10.1007/s11249-012-9929-4.

Liu et al., "Metallic Glass Coating on Metals Plate by Adjusted Explosive Welding Technique", Applied Surface Science, Jul. 16, 2009, vol. 255, pp. 9343-9347, doi:10.1016/j.apsusc.2009.07.033.

Liu et al., "Microstructure and Properties of Fe-Based Amorphous Metallic Coating Produced by High Velocity Axial Plasma Spraying", Science Direct, Journal of Alloys and Compounds, Apr. 23, 2009, vol. 484, pp. 300-307, doi:10.1016/j.jallcom.2009.04.086.

Liu et al., "Sliding Tribological Characteristics of a Zr-based Bulk Metallic Glass Near the Glass Transition Temperature", Tribol. Lett., Jan. 29, 2009, vol. 33, pp. 205-210.

Liu et al., "Wear Behavior of a Zr-Based Bulk Metallic Glass and Its Composites", Journal of Alloys and Compounds, May 5, 2010, vol. 503, pp. 138-144, doi:10.1016/j.jallcom.2010.04.2170.

Lu et al., "Crystallization Prediction on Laser Three-Dimensional Printing of Zr-based Bulk Metallic Glass", Journal of Non-Crystalline Solids, 2017, vol. 461, pp. 12-17, available online Jan. 29, 2017, http://dx.doi.org/10.1016/j.jnoncrysol.2017.01.038.

Lupoi et al., "Deposition of Metallic Coatings on Polymer Surfaces Using Cold Spray", Science Direct, Surface & Coatings Technology, Sep. 6, 2010, vol. 205, pp. 2167-2173, doi:10.1016/j.surfcoat.2010.08.128.

Ma et al., "Wear Resistance of Zr-Based Bulk Metallic Glass Applied in Bearing Rollers", Materials Science and Engineering, May 4, 2004, vol. A386, pp. 326-330.

Maddala et al., "Effect of Notch Toughness and Hardness on Sliding Wear of Cu50hf41.5a18.5 Bulk Metallic Glass", Scripta Materialia, Jul. 6, 2011, vol. 65, pp. 630-633, doi:10.1016/j.scriptamat.2011.06.046.

Madge, "Toughness of Bulk Metallic Glasses", Metals, Jul. 17, 2015, vol. 5, Issue 3, pp. 1279-1305, ISSN 2075-4701, doi:10.3390/met5031279.

Mahbooba et al., "Additive manufacturing of an iron-based bulk metallic glass larger than the critical casting thickness", Applied Materials Today, Feb. 27, 2018, vol. 11, pp. 264-269, https://doi.org/10.1016/j.apmt.2018.02.011.

Narayan et al., "On the hardness and elastic modulus of bulk metallic glass matrix composites", Scripta Materialia, Jun. 9, 2010, vol. 63, Issue 7, pp. 768-771, doi:10.1016/j.scriptamat.2010.06.010.

Ni et al., "High Performance Amorphous Steel Coating Prepared by HVOF Thermal Spraying", Journal of Alloys and Compounds, 2009, vol. 467, pp. 163-167, doi:10.1016/j.jallcom.2007.11.133.

Nishiyama et al., "Recent progress of bulk metallic glasses for strain-sensing devices", Materials Science and Engineering: A, Mar. 25, 2007, vols. 449-451, pp. 79-83, doi:10.1016/jmsea.2006.02.384.

Oh et al., "Microstructure and tensile properties of high-strength high-ductility Ti-based amorphous matrix composites containing ductile dendrites", Acta Materialia, Sep. 23, 2011, vol. 59, Issue 19, pp. 7277-7286, doi:10.1016/j.actamat.201.08.006.

Parlar et al., "Sliding Tribological Characteristics of Zr-Based Bulk Metallic Glass", Intermetallics, Jan. 2008, vol. 16, pp. 34-41, doi:10.1016/j.intermet.2007.07.001.

Pauly et al., "Modeling Deformation Behavior of Cu—Zr—Al Bulk Metallic Glass Matrix Composites", Applied Physics Letters, Sep. 2009, vol. 95, pp. 101906-1-101906-3, doi:10.1063/1.3222973.

Pauly et al., "Processing Metallic Glasses by Selective Laser Melting", Materials Today, Jan./Feb. 2013, vol. 16, pp. 37-41 http://dx.org/10.1016/j.mattod.2013.01.018.

Pauly et al., "Transformation-mediated ductility in CuZr-based bulk metallic glasses", Nature Materials, May 16, 2010, vol. 9, Issue 6, pp. 473-477, DOI:10.1038/NMAT2767.

Ponnambalam et al., "Fe-Based Bulk Metallic Glasses With Diameter Thickness Larger Than One Centimeter", J Mater Res, Feb. 17, 2004. vol. 19; pp. 1320-1323, DOI: 10.1557/JMR.2004.0176.

(56) References Cited

OTHER PUBLICATIONS

Porter et al., "Incorporation of Amorphous Metals into MEMS for High Performance and Reliability", Rockwell Scientific Company, Final Report, Nov. 1, 2003, 41 pgs.

Prakash et al., "Sliding Wear Behavior of Some Fe-, Co- and Ni-Based Metallic Glasses During Rubbing Against Bearing Steel", Tribology Letters, May 1, 2000, vol. 8, pp. 153-160.

Qiao et al., "Development of plastic Ti-based bulk-metallic-glass-matrix composites by controlling the microstructures", Materials Science and Engineering: A, Aug. 20, 2010, vol. 527, Issues 29-30, pp. 7752-7756, doi:10.1016/j.msea.2010.08.055.

Qiao et al., "Metallic Glass Matrix Composites", Materials Science and Engineering, Feb. 2016, vol. 100, pp. 1-69, http://dx.doi.org. 10.10163/jmser.2015.12.001.

Ramamurty et al., "Hardness and Plastic Deformation in a Bulk Metallic Glass", Acta Materialia, Feb. 2005, vol. 53, pp. 705-717, doi:10.1016/j.actamat.20004.10.023.

Revesz et al., "Microstructure and Morphology of Cu—Zr—Ti Coatings Produced by Thermal Spray and Treated by Surface Mechanical Attrition", Science Direct, Journal of Alloys and Compounds, Jul. 14, 2011, vol. 509S, pp. S482-S485, doi:10.1016/j.jallcom.2010.10.170.

Rigney et al., "The Evolution of Tribomaterial During Sliding: A Brief Introduction", Tribol. Lett, Jul. 1, 2010, vol. 39, pp. 3-7, DOI: 10.1007/s11249-009-9498-3.

Roberts, "Developing and Characterizing Bulk Metallic Glasses for Extreme Applications", XP055731434, Retrieved from the Internet (Dec. 16, 2013): URL:https://thesis.library.caltech.edu/8049/141/Scott_Roberts_thesis_2013_Complete_ Thesis. pdf [retrieved on Sep. 17, 2020].

Roberts et al., "Cryogenic Charpy Impact Testing of Metallic Glass Matrix Composites", Scripta Materialia, Nov. 11, 2011, 4 pgs., doi:10.1016/j.scriptamat.2011.01.011.

Sanders et al., "Stability of Al-rich glasses in the Al—La—Ni system", Intermetallics, 2006, vol. 14, pp. 348-351, doi:10.1016/j.intermet.2005.06.009.

Schuh et al., "A Survey of Instrumented Indentation Studies on Metallic Glasses", J. Mater. Res., Jan. 2004, vol. 19, No. 1, pp. 46-57.

Segu et al., "Dry Sliding Tribological Properties of Fe-Based Bulk Metallic Glass", Tribol. Lett., Apr. 28, 2012, vol. 47, pp. 131-138, DOI: 10.1007/s11249-012-9969-9.

Shen et al., "3D printing of large, complex metallic glass structures", Materials and Design, Mar. 2017, vol. 117, pp. 213-222, http://dx.doi.org/10.1016/j.matdes.2016.12.087.

Shen et al., "Exceptionally High Glass-Forming Ability of an Fecocrmocby Alloy", Applied Physics, Apr. 5, 2005, vol. 86, pp. 151907-1-151907-3, DOI: 10.1063/1.1897426.

Singer et al., "Wear behavior of triode-sputtered MoS2 coatings in dry sliding contact with steel and ceramics", Wear, Jul. 1996, vol. 195, Issues 1-2, pp. 7-20.

Sinmazcelik et al., "A review: Fibre metal laminates, background, bonding types and applied test methods", Materials and Design, vol. 32, Issue 7, 3671, Mar. 4, 2011, pp. 3671-3685, doi:10.1016/j.matdes.2011.03.011.

Song et al., "Strategy for pinpointing the formation of B2 CuZr in metastable CuZr-based shape memory alloys", Acta Materialia, Aug. 6, 2011, vol. 59, pp. 6620-6630, doi:10.1016/j.actamat.2011.07.017.

Sun et al., "Fiber metallic glass laminates", J. Mater. Res., Dec. 2010, vol. 25, No. 12, pp. 2287-2291, DOI: 10.1557/JMR.2010.0291.

Sundaram et al., "Mesoscale Folding, Instability, and Disruption of Laminar Flow in Metal Surfaces", Physical Review Letters, Sep. 7, 2012, vol. 109, pp. 106001-1-106001-5, DOI: 10.1103/PhysRevLett.109.106001.

Szuecs et al., "Mechanical Properties of $Zr_{56.2}Ti_{13.8}Nb_{5.0}Cu_{6.9}Ni_{5.6}Be_{12.5}$ Ductile Phase Reinforced Bulk Metallic Glass Composite", Acta Materialia, Feb. 2, 2001, vol. 49, Issue 9, pp. 1507-1513.

Tam et al., "Abrasion Resistance of Cu Based Bulk Metallic Glasses", Journal of Non-Crystalline Solids, Oct. 18, 2004, vol. 347, pp. 268-272, doi:10.1016/j.noncrysol.2004.09.008.

Tam et al., "Abrasive Wear of Cu60zr30ti10 Bulk Metallic Glass", Materials Science and Engineering, Apr. 1, 2004, vol. A384 pp. 138-142, doi:10.1016/j.msea.2004.05.73.

Tan et al., "Synthesis of La-based in-situ bulk metallic glass matrix composite", Intermetallics, Nov. 2002, vol. 10, Issues 11-12, pp. 1203-1205.

Tao et al., "Effect of Rotational Sliding Velocity on Surface Friction and Wear Behavior in Zr-Based Bulk Metallic Glass", Journal of Alloys and Compounds, Mar. 4, 2010, vol. 492, pp. L36-L39, doi:10.1016/j.jallcom.2009.11.113.

Tao et al., "Influence of Isothermal Annealing on the Micro-Hardness and Friction Property in Cuzral Bulk Metallic Glass", Advanced Materials Research, Jan. 1, 2011, vols. 146-147, pp. 615-618, doi:10.4028/www.scientific.net/AMR.146-147.615.

Tobler et al., "Cryogenic Tensile, Fatigue, and Fracture Parameters for a Solution-Annealed 18 Percent Nickel Maraging Steel", Journal of Engineering Materials and Technology, Apr. 1, 1978, vol. 100, pp. 189-194.

Wagner, "Mechanical Behavior of 18 Ni 200 Grade Maraging Steel at Cyrogenic Temperatures", J Aircraft, Nov. 1, 1986, vol. 23, No. 10, pp. 744-749.

Wang et al., "Progress in Studying the Fatigue Behavior of Zr-Based Bulk-Metallic Glasses and Their Composites", Intermetallics, Mar. 6, 2009, vol. 17, pp. 579-590, doi:10.1016/j.intermet.2009.01.017.

Whang et al., "Microstructures and age hardening of rapidly quenched Ti—Zr—Si alloys", Journal of Materials Science Letters, 1985, vol. 4, pp. 883-887.

Wu et al., "Bulk Metallic Glass Composites with Transformation-Mediated Work-Hardening and Ductility", Adv. Mater., Apr. 26, 2010, vol. 22, pp. 2770-2773, DOI: 10.1002/adma.201000482.

Wu et al., "Dry Sliding tribological behavior of Zr-based bulk metallic glass", Transactions of Nonferrous Metals Society of China, Jan. 16, 2012, vol. 22, Issue 3, pp. 585-589, DOI: 10.1016/S10003-6326(11)61217-X.

Wu et al., "Effects of Environment on the Sliding Tribological Behaviors of Zr-Based Bulk Metallic Glass", Intermetallics, Jan. 27, 2012, vol. 25, 115-125, doi:10.1016/j.intermet.2011.12.025.

Wu et al., "Formation of Cu—Zr—Al bulk metallic glass composites with improved tensile properties", Acta Materialia 59, Feb. 19, 2011, pp. 2928-2936, doi:10.1016/j.actamat.2011.01.029.

Wu et al., "Use of rule of mixtures and metal volume fraction for mechanical property predictions of fibre-reinforced aluminum laminates", Journal of Materials Science, vol. 29, issue 17, 4583, Jan. 1994, 9 pages.

Yao et al., "Fe-Based Bulk Metallic Glass with High Plasticity", Applied Physics Letters, Feb. 5, 2007, vol. 90, 061901, doi: 10.1063/1.2437722.

Yin et al., "Microstructure and Mechanical Properties of a Spray-Formed Ti-Based Metallic Glass Former Alloy", Journal of Alloys and Compounds, Jan. 25, 2012, vol. 512, pp. 241-245, doi:10.1016/j.jallcom.2011-09.074.

Yokoyama et al., "Tough Hypoeutectic Zr-Based Bulk Metallic Glasses", Metallurgical and Materials Transactions, Year 2011, vol. 42A, pp. 1468-1475, DOI: 10.1007/s11661-011-0631-1.

Zachrisson et al., "Effect of Processing on Charpy Impact Toughness of Metallic Glass Matrix Composites", Journal of Materials Research, May 28, 2011, vol. 26, No. 10, pp. 1260-1268, DOI: 10.1557/jmr.2011.92.

Zhang et al., "Abrasive and Corrosive Behaviors of Cu—Zr—Al—Ag—Nb Bulk Metallic Glasses", Journal of Physics: Conference Series, 2009, vol. 144, pp. 1-4, doi:10.1088/1742-6596/1441/1/012034.

Zhang et al., "Grain morphology control and texture characterization of laser solid formed Ti6Al2Sn2Zr3Mo1.5Cr2Nb titanium alloy", Journal of Materials Processing Technology, Elsevier, NL, vol. 238, Jul. 8, 2016, pp. 202-211, XP029700970, ISSN: 0924-0136, DOI: 10.1016/J.JMATPROTEC.2016.07.011.

Zhang et al., "Robust Hydrophobic Fe-Based Amorphous Coating by Thermal Spraying", Applied Physics Letters, Sep. 20, 2012, vol. 101, pp. 121603-1-121603-4.

(56) References Cited

OTHER PUBLICATIONS

Zhang et al., "Wear Behavior of a Series of Zr-Based Bulk Metallic Glasses", Materials Science and Engineering, Feb. 25, 2008, vol. A475, pp. 124-127, doi: 10.1016/j.msea.2007.05.039.
Zheng et al., "Processing and Behavior of Fe-Based Metallic Glass Components via Laser-Engineered Net Shaping", Metallurgical and Materials Transactions A, 40A, 1235-1245, DOI: 10.1007/s11661-009-9828-y.
Zhou et al., "Microstructure and Electrochemical Behavior of Fe-Based Amorphous Metallic Coatings Fabricated by Atmospheric Plasma Spraying", Journal of Thermal Spray Technology, Jan. 2011, vol. 20, No. 1-2, pp. 344-350, DOI: 10.1007/s11666-010-9570-4.
Zhu et al., "Ta-particulate reinforced Zr-based bulk metallic glass matrix composite with tensile plasticity", Scripta Materialia, Mar. 2010, vol. 62, Issue 5, pp. 278-281, doi:10.1016/j.scriptamat.2009.11.018.
Zhuo et al., "Ductile Bulk Aluminum-Based Alloy with Good Glass-Forming Ability and High Strength", Chinese Physics Letters, 2009, vol. 26, No. 6, pp. 066402-1-066402-4.
Zhuo et al., "Spray Formed Al-Based Amorphous Matrix Nanocomposite Plate", Journal of Alloys and Compounds, Mar. 1, 2011, vol. 509, pp. L169-L173, doi:10.1016/j.jallcom.2011.02.125.
Guo et al., "Development of in-situ Development of in-situ B—Ti reinforced Be-free Ti-based bulk metallic glass matrix composites", Journal of Alloys and Compounds 714 (2017) 120-125.
Inoue et al., "Superconductivity of Ductile Titanium-Niobium based Amorphous Alloys", Journal de Physique Colloques, 1980, 41 (C8), pp. C8-758-C8-761. 10.1051/jphyscol:19808189. jpa-00220292.
Ma et al., "Formation of New Ti-based Metallic Glassy Alloys", Materials Transactions, vol. 45, No. 5, 2004. pp. 1802-1806.

\* cited by examiner

FIG. 3B

| Alloy | Tg (K) | Tx (K) | ΔT (K) | Tl (K) | Trg | $d_c$ (mm) |
|---|---|---|---|---|---|---|
| $Zr_{65.5}Cu_{22.4}Ni_{6.5}Al_{5.6}$ | 636 | 733 | 97 | 1211 | 0.525 | <6 |
| $Zr_{65.3}Cu_{20}Ni_{8.2}Al_{6.5}$ | 640 | 745 | 105 | 1188 | 0.539 | <6 |
| $Zr_{65}Cu_{17.5}Ni_{10}Al_{7.5}$ | 650 | 750 | 100 | 1153 | 0.564 | <6 |
| $Zr_{64.8}Cu_{15.5}Ni_{13.2}Al_{8.3}$ | 653 | 752 | 99 | 1143 | 0.572 | <6 |
| $Zr_{64.5}Cu_{13.1}Ni_{13.2}Al_{9.2}$ | 658 | 757 | 99 | 1138 | 0.578 | 6 |
| $Zr_{63.5}Cu_{7.6}Ni_{17.2}Al_{11.4}$ | 671 | 758 | 87 | 1153 | 0.582 | 6 |
| $Zr_{58.5}Nb_{2.8}Cu_{15.6}Ni_{12.9}Al_{10.3}$ | 674 | 776 | 102 | 1103 | 0.611 | >10 |
| $Zr_{57}Nb_5Cu_{15.4}Ni_{12.6}Al_{10}$ | 687 | 751 | 64 | 1092 | 0.63 | 10 |
| $Zr_{57}Ti_5Cu_{20}Ni_8Al_{10}$ | 676 | 725 | 49 | 1095 | 0.62 | 10 |
| $Zr_{53}Ti_5Cu_{16}Ni_{10}Al_{16}$ | 697 | 793 |  | 1118 | 0.62 | 8 |
| $Zr_{61.88}Cu_{18}Ni_{10.12}Al_{10}$ | 653 | 744 | 91 |  |  | >5 |
| $Zr_{64.13}Cu_{15.75}Ni_{10.12}Al_{10}$ | 643 | 745 | 102 |  |  | >5 |
| $Zr_{62}Cu_{15.5}Ni_{12.5}Al_{10}$ | 652 | 748 | 96 |  |  | >5 |
| $Zr_{70}Ni_{16}Cu_6Al_8$ | 700 | 775 | 75 |  |  | <5 |

FIG. 6A

TABLE I. The critical cooling rate $R_c$, characteristic temperatures ($T_g$, $T_l$, $T_o$), reduced glass transition temperature $T_{rg}$, strength parameter $D$, fragility index $m$, and GFA parameter $F_1$ for several bulk metallic glasses and two oxide glasses.

| Glass formers | $R_c$ (K/s) | $T_g$ (K) | $T_l$ (K) | $T_o$ (K) | $D$ | $m$ | $F_1$ ($D$) | $F_1$ ($T_o$) |
|---|---|---|---|---|---|---|---|---|
| $Mg_{65}Cu_{25}Y_{10}$[a] | 50 | 402 | 730 | 260 | 22.1 | 50 | 0.479 | 0.464 |
| $Pd_{40}Ni_{40}P_{20}$[b] | 1.6 | 578 | 973 | 390 | 18.1 | 50 | 0.491 | 0.488 |
| $Pd_{48}Ni_{32}P_{20}$[c] | 10 | 590 | 985 | 392 | 16.6 | 43 | 0.481 | 0.501 |
| $Pd_{77.5}Cu_6Si_{16.5}$[d] | 500 | 637 | 1058 | 493 | 11.1 | 73 | 0.412 | 0.406 |
| $Cu_{47}Ti_{34}Zr_{11}Ni_8$[e] | 250 | 673 | 1128 | 500 | 12.0 | 59 | 0.421 | 0.432 |
| $Zr_{41.2}Ti_{13.8}Cu_{12.5}Ni_{10}Be_{22.5}$[f] | 1.2 | 625 | 993 | 412.5 | 18.5 | 46 | 0.532 | 0.536 |
| $Zr_{46.75}Ti_{8.25}Cu_{7.5}Ni_{10}Be_{27.5}$[g] | 8.0 | 590 | 1020 | 372 | 22.7 | 46 | 0.511 | 0.503 |
| $SiO_2$[h] | $10^{-5}$ | 1452 | 1999 | 530 | 63.3 | 25 | 0.770 | 0.771 |
| $GeO_2$[h] | $10^{-3}$ | 816 | 1388 | 199 | 112.6 | 21 | 0.683 | 0.683 |

FIG. 6B

TABLE II. The critical cooling rate $R_c$, glass transition $T_g$ and liquidus $T_l$ temperatures, fragility index $m$, and GFA parameter $F_1$ for several bulk metallic glasses and nonmetallic glasses.

| Glass formers | $R_c$ (K/s) | $T_g$ (K) | $T_l$ (K) | $m$ | $F_1$ |
|---|---|---|---|---|---|
| $La_{55}Al_{25}Ni_{20}$[a] | 89 | 491 | 941 | 42 | 0.455 |
| $La_{55}Al_{25}Cu_{20}$[b] | 109 | 456 | 896 | 43 | 0.435 |
| $La_{55}Al_{25}Ni_{15}Cu_5$[c] | 20 | 472 | 900 | 37 | 0.485 |
| $La_{55}Al_{25}Ni_{10}Cu_{10}$[c] | 10 | 467 | 835 | 35 | 0.540 |
| $La_{55}Al_{25}Ni_5Cu_{15}$[c] | 43 | 459 | 878 | 42 | 0.453 |
| $La_{55}Al_{25}Ni_5Cu_{10}Co_5$[c] | 7.9 | 466 | 823 | 37 | 0.530 |
| $Pd_{40}Ni_{10}Cu_{30}P_{20}$[d] | 0.1 | 577 | 836 | 52 | 0.578 |
| $Zr_{65}Al_{7.5}Ni_{10}Cu_{17.5}$[e] | 1.5 | 656 | 1168 | 35 | 0.539 |
| Silica[f] | $10^{-4}$ | 1393 | 2003 | 28 | 0.687 |
| Germania[g] | $10^{-2}$ | 820 | 1383 | 24 | 0.660 |
| $CaO \cdot MgO \cdot 2SiO_2$[h] | 169 | 995 | 1664 | 66 | 0.419 |
| $Na_2O \cdot 2SiO_2$[i] | $1.7 \times 10^{-3}$ | 708 | 1135 | 29 | 0.647 |
| $Li_2O \cdot 2SiO_2$[j] | 1.0 | 710 | 1316 | 33 | 0.532 |
| Salol[j] | 1.0 | 218 | 313 | 66 | 0.521 |

FIG. 14A

| Alloy | Tg (K) | Tx (K) | ΔT (K) | Tl (K) | Trg | $d_c$ (mm) |
|---|---|---|---|---|---|---|
| $Zr_{60}Nb_5Cu_{22.5}Pd_5Al_{7.5}$ | 683 | 722 | 39 | | | >3 |
| $Zr_{60}Ti_6Cu_{19}Fe_5Al_{10}$ | 645 | 699 | 54 | | | >3 |
| $Zr_{60}Nb_5Cu_{20}Fe_5Al_{10}$ | 623 | 722 | 99 | | | >3 |
| $(Zr_{62}Cu_{23}Fe_5Al_{10})$ | 651 | 751 | 100 | 1186 | 0.549 | 3 |
| $(Zr_{62}Cu_{23}Fe_5Al_{10})_{99}Ag_1$ | 656 | 753 | 97 | 1175 | 0.558 | 4 |
| $(Zr_{62}Cu_{23}Fe_5Al_{10})_{97}Ag_3$ | 658 | 743 | 85 | 1181 | 0.557 | 10 |
| $(Zr_{62}Cu_{23}Fe_5Al_{10})_{95}Ag_5$ | 663 | 747 | 84 | 1189 | 0.551 | 5 |
| $(Zr_{62}Cu_{23}Fe_5Al_{10})_{93}Ag_7$ | 664 | 751 | 87 | 1191 | 0.558 | 4 |
| $Zr_{58}Cu_{22}Co_4Fe_4Al_{12}$ | 673 | 788 | 115 | 1217 | 0.55 | 5 |
| $Zr_{58}Cu_{22}Co_4Ag_4Al_{12}$ | 679 | 761 | 82 | 1183 | 0.57 | 5 |
| $Zr_{58}Cu_{22}Co_2Ag_6Al_{12}$ | 675 | 751 | 76 | 1227 | 0.55 | 5 |
| $Zr_{58}Cu_{22}Ag_4Fe_2Al_{12}$ | 675 | 757 | 82 | 1205 | 0.56 | 5 |
| $Zr_{58}Cu_{22}Ag_6Fe_2Al_{12}$ | 676 | 748 | 72 | 1227 | 0.55 | 5 |
| $Zr_{62-90}Cu_{10-23}X$ | | | | | | <1mm |

FIG. 14B

| Alloy | Tg (K) | Tx (K) | ΔT (K) | Tl (K) | Trg | $d_c$ (mm) |
|---|---|---|---|---|---|---|
| $Pt_{76.5}P_{18}B_4Si_{1.5}$ | 474 | 511 | 37 | 859 | 0.552 | 0.5 |
| $Pt_{74.4}Ni_{2.1}P_{18}B_4Si_{1.5}$ | 473 | 521 | 48 | 855 | 0.553 | 0.7 |
| $Pt_{74.5}Cu_2P_{18}B_4Si_{1.5}$ | 480 | 528 | 48 | 865 | 0.555 | 0.9 |
| $Pt_{74.5}Cu_{1.2}Ni_{0.8}P_{18}B_4Si_{1.5}$ | 476 | 522 | 46 | 857 | 0.555 | 1.3 |
| $Pt_{74.7}Cu_{1.5}Ag_{0.3}P_{18}B_4Si_{1.5}$ | 479 | 529 | 50 | 862 | 0.556 | 2.0 |
| $Pt_{57.5}Cu_{14.7}Ni_{5.3}P_{22.5}$ | 508 | 606 | 98 | 1068 | 0.64 | 16 |
| $Pt_{42.5}Cu_{27}Ni_{9.5}P_{21}$ | 515 | 589 | 74 | 1146 | 0.59 | 20 |
| $Pt_{60}Cu_{16}Co_2P_{22}$ | 506 | 569 | 63 | 1154 | 0.58 | 16 |
| $Pt_{60}Cu_{20}P_{20}$ | 522 | 580 | | 1117 | | <4 |
| $Pt_{75-95}Cu_{1-20}X$ | | | | | | <1 |
| $Pt_{75-95}P_{1-20}X$ | | | | | | <1 |

FIG. 14C

Critical casting diameters of selected compositions of Table 1.

| Alloy | Used in ... | $d_c$ [mm] | $\Delta T$ | $T_{rg}$ |
|---|---|---|---|---|
| $Pt_{55.95}Si_{6.9}B_{18}Cu_{16.65}Ge_{2.5}$ | Fig. 9a | 1-2 | 12 | 0.57 |
| $Pt_{59.99}Si_{6.4}B_{24}Cu_{6.61}Ge_3$ | Fig. 9b | <1 | 15 | 0.53 |
| $Pt_{52.5}Si_{10.5}B_{19.5}Cu_{19.5}$ | Fig. 5 | 2-5 | 22 | 0.61 |
| $Pt_{56.685}Si_{6.4}B_{24}Cu_{6.61}Ge_3$ | Fig. 9b | <1 | 31 | 0.55 |
| $Pt_{49.95}Si_{9.4}B_{24}Cu_{16.65}$ | Fig. 5 | <1 | 33 | 0.62 |
| $Pt_{48.75}Si_9B_{24}Cu_{16.65}$ | Fig. 5 | <1 | 39 | 0.61 |
| $Pt_{51.075}Si_{9.9}B_{22}Cu_{17.025}$ | Fig. 5 | 1-2 | 40 | 0.61 |
| $Pt_{49.95}Si_{8.4}B_{24}Cu_{16.65}Ge_1$ | Fig. 8 | 2-5 | 42 | 0.62 |
| $Pt_{53.38}Si_{7.4}B_{24}Cu_{13.22}Ge_3$ | Fig. 9b | 2-5 | 49 | 0.57 |
| $Pt_{49.95}Si_{7.4}B_{24}Cu_{16.65}Ge_2$ | Fig. 8 | 2-5 | 58 | 0.62 |
| $Pt_{51.95}Si_{6.9}B_{22}Cu_{16.65}Ge_{2.5}$ | Fig. 9a | 2-5 | 63 | 0.61 |
| $Pt_{49.95}Si_{6.4}B_{24}Cu_{16.65}Ge_3$ | Fig. 8 | 5.3 | 70 | 0.61 |

FIG. 14D

| Alloy | Tg (K) | Tx (K) | ΔT (K) | Tl (K) | Trg | $d_c$ (mm) |
|---|---|---|---|---|---|---|
| $Pd_{79}Ag_{3.5}P_6Si_{9.5}Ge_2$ | 613 | 644 | 31 | 1065 | 0.575 | 6 |
| $Pd_{40}Cu_{30}Ni_{10}P_{20}$ | 575 | 670 | 95 | 833 | 0.690 | 80 |
| $Pd_{40}Ni_{40}P_{20}$ | 589 | 670 | 81 | 1006 | 0.585 | 6 |
| $Pd_{35}Pt_{35}Cu_{30}P_{20}$ | 540 | 615 | 75 | 825 | 0.655 | 30 |
| $Pd_{79}Cu_6Si_{10}P_5$ | 600 | 680 | 80 | | | 6 |
| $Pd_{79-95}$-P-X | | | | | | <1 |

FIG. 14E

| Alloy | Tg (K) | Tx (K) | ΔT (K) | Tl (K) | Trg | $d_c$ (mm) |
|---|---|---|---|---|---|---|
| $Cu_{60}Zr_{33}Ti_7$ | 740 | 768 | 28 | 1191 | 0.62 | 3 |
| $Cu_{54}Ag_6Zr_{33}Ti_7$ | 709 | 738 | 29 | 1135 | 0.62 | 6 |
| $Cu_{46.4}Ag_{11.6}Zr_{35}Ti_7$ | 689 | 732 | 43 | 1119 | 0.62 | 6 |
| $Cu_{44.25}Ag_{14.75}Zr_{35}Ti_6$ | 693 | 730 | 37 | 1112 | 0.62 | 8 |
| $Cu_{44.25}Ag_{14.75}Zr_{36}Ti_5$ | 700 | 734 | 34 | 1115 | 0.63 | 10 |
| $Cu_{50}Zr_{50}$ | 671 | 717 | 46 | | | 2 |
| $Cu_{47.5}Zr_{47.5}Al_5$ | 698 | 772 | 74 | | | 3 |
| $Cu_{60}Zr_{30}Ti_{10}$ | 713 | 750 | 37 | 1153 | 0.62 | 4 |
| $Cu_{60}Zr_{20}Ti_{20}$ | 708 | 743 | 35 | 1123 | 0.63 | 4 |
| $Cu_{60}Hf_{30}Ti_{10}$ | 725 | 785 | 60 | 1170 | 0.62 | 4 |
| $Cu_{60}Hf_{25}Ti_{15}$ | 730 | 795 | 65 | 1160 | 0.63 | 4 |
| $(Cu_{60}Zr_{30}Ti_{10})_{99}Sn_1$ | 730 | 776 | 46 | 1155 | 0.63 | 5 |
| $(Cu_{60}Zr_{30}Ti_{10})_{98}Sn_2$ | 730 | 772 | 42 | 1150 | 0.63 | 4 |
| $(Cu_{60}Zr_{30}Ti_{10})_{97}Sn_3$ | 747 | 782 | 35 | 1148 | 0.65 | 4 |
| $(Cu_{60}Zr_{30}Ti_{10})_{96}Sn_4$ | 745 | 770 | 25 | 1135 | 0.65 | 4 |

FIG. 14F

| Alloy | Tg (K) | Tx (K) | ΔT (K) | Tl (K) | Trg | $d_c$ (mm) |
|---|---|---|---|---|---|---|
| Ni59Ta41 | 1000 | 1045 | 45 | 1630 | 0.61 | 2 |
| Ni60Ta40 | 1000 | 1045 | 45 | 1630 | 0.61 | 2 |
| Ni61Ta39 | 1000 | 1045 | 45 | 1630 | 0.61 | 2 |
| Ni62Ta38 | 1000 | 1045 | 45 | 1630 | 0.61 | 2 |
| $Ni_{73.375}Cr_{3.5}Nb_{3.625}P_{16.5}B_3$ | | | | | | 8 |
| $Ni_{65.5}Cr_{12.5}Nb_{2.5}P_{16.5}B_3$ | | | | | | 8 |
| $Ni_{71.4}Cr_{5.52}Nb_{3.38}P_{16.67}B_{3.03}$ | | | | | | 10 |
| $Ni_{(100-a-b-c-d)}Cr_aNb_bP_cB_d$ | | | | | | |
| $Ni_{68.6}Cr_{8.7}Nb_3P_{16}B_{3.2}Si_{0.5}$ | 678 | 722 | 44 | 1157 | 0.586 | 17 |
| $Ni_{75-95}BX$ | | | | | | <1 |
| $Ni_{75-95}PX$ | | | | | | <1 |

FIG. 14G

| Alloy | Tg (K) | Tx (K) | ΔT (K) | Tl (K) | Trg | $d_c$ (mm) |
|---|---|---|---|---|---|---|
| $Fe_{75}Mo_5P_{10}C_{7.5}B_{2.5}$ | 710 | 750 | 40 | | | 2 |
| $(Fe_{76}Si_{9.6}B_{8.4}P_6)$ | 783 | 831 | 48 | 1340 | 0.62 | 2.5 |
| $(Fe_{76}Si_{9.6}B_{8.4}P_6)_{90}Cu_{10}$ | 785 | 831 | 46 | 1346 | 0.58 | 2.5 |
| $Fe_{60}Co_{14}Ga_2P_{10}B_5Si_3Al_3C_3$ | 735 | 777 | 42 | | | 1 |
| $Fe_{80-95}$-P-X | | | | | | <1 |
| $Fe_{80-95}$-B-X | | | | | | <1 |

FIG. 14H

TABLE 1. Glass-transition temperature $T_g$, critical rod diameter $d_c$, molar volume $v_m$, shear modulus $G$, bulk modulus $B$, and notch toughness $K_Q$ for (Fe,Cr,Ni,Mo)–P–(C,B) glassy alloys.

| Composition | $T_g$ (°C) | $d_c$ (mm) | $v_m$ (m³/mol) | $G$ (GPa) | $B$ (GPa) | $K_Q$ (MPa m$^{1/2}$) |
|---|---|---|---|---|---|---|
| $Fe_{80}P_{12.5}C_{7.5}$ | 405 | 0.05[a] | | 56[b] | | 32[c] |
| $Fe_{80}P_{12.5}(C_5B_{2.5})$ | 412 | 0.5 | | | | |
| $(Fe_{74.5}Mo_{5.5})P_{12.5}(C_5B_{2.5})$ | 429 | 3 | 6.85×10⁻⁶ | 56.94±0.09 | 145.0±0.3 | 53.1±2.4 |
| $(Fe_{76}Mo_2Ni_2)P_{12.5}(C_5B_{2.5})$ | 423 | 4 | 6.89×10⁻⁶ | 57.31±0.08 | 150.1±0.4 | 49.8±4.2 |
| $(Fe_{68}Mo_5Ni_5Cr_2)P_{12.5}(C_5B_{2.5})$ | 426 | 6 | 6.87×10⁻⁶ | 57.94±0.07 | 149.7±0.3 | 44.2±4.6 |

FIG. 14I-1

| Composition [at%] | $t_c$ [mm] | Density [gcm$^{-3}$] | Method | $\sigma_y$ [MPa] | $\varepsilon_y$ [%] | $\sigma_f$ [MPa] | $\varepsilon_p$ [%] | E [GPa] | Hv | $T_g$ [K] | $T_x$ [K] | $\Delta T_x$ [K] | Refs. |
|---|---|---|---|---|---|---|---|---|---|---|---|---|---|
| Ti$_{34}$Zr$_{11}$Cu$_{47}$Ni$_8$ | 4 | 7.15 | Cu mold casting | | | | | | 628 | 671 | 717 | 46 | [113] |
| Ti$_{50}$Ni$_{15}$Cu$_{25}$Sn$_5$ Zr$_5$ | 6 | 6.16 | Cu mold casting | | | | | | | 700 | 750 | 50 | [114] |
| Ti$_{50}$Ni$_{24}$Cu$_{20}$B$_1$Si$_2$Sn$_3$ | 1 | 6.04 | Cu mold casting | | | 2100 | | 110 | 620 | 726 | 800 | 50 | [115] |
| Ti$_{50}$Ni$_{19}$Cu$_{25}$Sn$_3$ Be$_7$ | 2 | 5.93 | Cu mold casting | | 1.8 | 2170 | 4 | | 670 | 733 | 786 | 50 | [116,117] |
| Ti$_{45}$Ni$_{15}$Cu$_{25}$Sn$_3$ Be$_7$ Zr$_5$ | 5 | 6.05 | Cu mold casting | | 1.8 | 2480 | 4 | | 715 | 685 | 741 | 50 | [117] |
| Ti$_{40}$Zr$_{25}$Ni$_8$ Cu$_9$ Ne$_{18}$ | 8 | 5.5 | Cu mold casting | | 1.8 | 1810 | 4 | | 560 | 621 | 688 | 50 | [118] |
| Ti$_{55}$Zr$_{10}$Be$_{18}$Cu$_9$ Ni$_8$ | 6 | 5.11 (5.04) | Cu mold casting | 2070 | | | | | 690 | 629 | 667 | 50 | [119] |
| Ti$_{53}$Cu$_{15}$Ni$_{18.5}$Al$_7$Zr$_3$Si$_3$B$_{1.5}$ | 2.5 | 5.11 | Cu mold casting | | | 2160 | | | | 703 | 765 | 50 | [120] |
| Ti$_{45}$Zr$_{16}$Be$_{20}$Cu$_{10}$Ni$_9$ | 10 | 5.32 | Cu mold casting | | | 2105 | 6.9 | | | 695 | 745 | 50 | [121] |
| Ti$_{53}$Cu$_{15}$Ni$_{18.5}$Al$_7$ Hf$_3$ Sn$_3$ B$_5$ | 2 | 5.72 | Cu mold casting | | | | | | | 673 | 715 | 50 | [122] |
| Ti$_{45}$Zr$_5$ Cu$_{45}$Ni$_5$ | 3 | 6.39 | Cu mold casting | | | 1926 | 1.8 | 86.9 | | 685 | 754 | 50 | [123] |
| Ti$_{30}$Zr$_{35}$Cu$_{8.25}$Be$_{26.75}$ | 15 | 5.39 (5.4) | Cu mold casting | 1950 | 2.3 | 1950 | 0.5 | 82 | | 669 | 718 | 50 | [124] |
| Ti$_{40}$Zr$_{10}$Cu$_6$Pd$_{14}$ | 6 | 6.98 | Cu mold casting | | | 1970 | | 95 | | 688 | 733 | 50 | [125] |
| Ti$_{50}$Cu$_{25}$Ni$_{15}$Sn$_3$ Be$_7$ | 2 | 5.93 | Cu mold casting | 2050 | 2.2 | 2050 | 3.5 | | | 681 | 737 | 50 | [126] |
| Ti$_{45}$Zr$_{10}$Pd$_{10}$Cu$_{33}$Sn$_4$ | 4 | 6.62 | Cu mold casting | 1860 | | | | 96.8 | | 689 | 739 | 50 | [127] |
| Ti$_{40}$Zr$_{10}$Cu$_{34}$Pd$_{14}$Sn$_2$ | 10 | 6.97 | Cu mold casting | 1720 | 1.9 | 1900 | 3.5 | 94.8 | | 597 | 654 | 50 | [128] |
| Ti$_{45}$Zr$_{10}$Be$_{35}$ | 6 | 4.62 (4.59) | Cu mold casting | | | 2050 | 5-11 | | | 599 | 692 | 50 | [129] |
| Ti$_{40}$Zr$_{25}$Be$_{30}$Cr$_5$ | 8 | 4.93 (4.89) | Cu mold casting | | | 2230 | 0 to 5 | | | 667 | 704 | 50 | [129] |
| Ti$_{50}$Cu$_{43}$Ni$_7$ | 1.5 | 6.27 | Cu mold casting | 2360 | | 2640 | 2.24 | | | 664 | 708 | 50 | [130] |
| Ti$_{44.2}$Zr$_{7.8}$Cu$_{39}$Ni$_{10}$ | 3 | 6.37 | Cu mold casting | | | 1800 | | 97.8 | | 649 | 699 | 50 | [130] |
| (Ti$_{36.1}$Zr$_{33.2}$Ni$_{3.8}$ Be$_{24.9}$)$_{91.9}$Cu$_9$ | 3 | 6.37 | Cu mold casting | | | | | | 507 | 611 | 655 | 50 | [131] |
| Ti$_{43.15}$Zr$_{9.39}$Cu$_{36.24}$Ni$_{9.06}$Sn$_{1.96}$ | 50 | 5.51 (5.541) | water quenching | | | | | | | | | | [111] |
| Ti$_{33}$Cu$_{47}$Zr$_9$ Ni$_6$ Sn$_2$ Si$_1$ Nb$_2$ | 3 | 6.75 | Cu mold casting | | | 2170 | 2.5 | | | 723 | 755 | 50 | [132] |

| Composition | | | | | | | |
|---|---|---|---|---|---|---|---|
| Ti33.8Cu46.35Ni8.4Zr11.4 | 4 | | Cu mold casting | | 670 | 718 | 49 | [133] |
| Ti37.55Cu43.25Ni9.6Zr11.4 | 3 | | Cu mold casting | | 673 | 707 | 34 | [133] |
| Ti41Zr25Be24Al10 | 2 | 4.81 | Suction casting | 2050 | 2373 | 17.2 | 633 | 693 | 60 | [134] |
| Ti41Zr25Be26Al8 | 3 | 4.81 | Suction casting | 2084 | 3820 | 47.0 | 628 | 694 | 66 | [134] |
| Ti41Zr25Be28Al6 | 7 | 4.80 | Suction casting | 1996 | 2190 | 16.3 | 624 | 691 | 67 | [134] |
| Ti41Zr25Be29Al5 | 7 | 4.80 | Suction casting | 1938 | 2130 | 6.0 | 619 | 689 | 70 | [134] |
| Ti41Zr25Be30Al4 | 6 | 4.79 | Suction casting | 1990 | 2125 | 4.3 | 622 | 683 | 61 | [134] |
| Ti41Zr25Be32Al2 | 5 | 4.78 | Suction casting | 1948 | 2217 | 14.3 | 610 | 673 | 63 | [134] |
| Ti41Zr25Be34 | 5 | 4.76 | Suction casting | 1755 | 1914 | 2.9 | 599 | 656 | 57 | [134] |
| Ti41Zr26Be28Fe6 | 8 | 4.88 | Suction casting | 1964 | 2268 | 11.2 | 618 | 725 | 107 | [135] |
| Ti41Zr26Be28Fe6 | 10 | 4.93 | Suction casting | 1989 | 2162 | 7.4 | 615 | 715 | 100 | [136] |
| (Ti41Zr25Be34)92Fe8 | 10 | 4.99 | Suction casting | 2128 | 2218 | 0.9 | 619 | 730 | 111 | [137] |
| Ti41Zr25Be29Al6 | 10 | 5.27 | Suction casting | 1961 | 2013 | 2.3 | 597 | 655 | 58 | [138] |
| (Ti41Zr29Al5)91Cu9 | 10 | 5.07 | Suction casting | 2093 | 2209 | 0.6 | 637 | 705 | 70 | [139] |
| Ti50Cu43Nb7 | 1 | | Cu mold casting | | 688 | 707 | 19 | [112] |

*FIG. 14T-2*

HYPOEUTECTIC AMORPHOUS METAL-BASED MATERIALS FOR ADDITIVE MANUFACTURING

CROSS-REFERENCE TO RELATED APPLICATIONS

The present application is a continuation of U.S. patent application Ser. No. 15/989,083, entitled "Hypoeutectic Amorphous Metal-Based Materials for Additive Manufacturing," filed May 24, 2018, which claims priority to U.S. Provisional Application No. 62/510,618, entitled "Systems and Methods for Developing Tough Amorphous Metal-Based Materials for Additive Manufacturing", filed May 24, 2017, the disclosures of which are incorporated herein by reference in their entireties.

STATEMENT OF FEDERAL FUNDING

The invention described herein was made in the performance of work under a NASA contract NNN12AA01C, and is subject to the provisions of Public Law 96-517 (35 USC 202) in which the Contractor has elected to retain title.

FIELD OF THE INVENTION

The present invention generally relates to bulk amorphous metal materials and parts with improved toughness and methods of manufacture thereof from hypoeutectic bulk amorphous metal materials.

BACKGROUND OF THE INVENTION

Amorphous metals, also known as metallic glasses or glassy metals, are solid, metal-based alloy materials with a disordered and, therefore, glass-like atomic-scale structure, in contrast to the highly ordered atomic structure of conventional crystalline metal materials. Amorphous metal alloy formulations are typically very complex and precisely composed of one main (predominant in the amount) metal (M) and one or more other metal or non-metal elements to allow for the melts of these materials to be quenched into a vitreous state and avoid crystallization upon cooling. The metallic glass alloys that can be cast (with reasonable cooling rates) into a relatively large thickness (generally over 1 mm) without pronounced crystallization are called bulk metallic glasses (BMGs). On the other hand, an in-situ composite or bulk metallic glass matrix composite (BMGMC) is defined as an alloy which, upon rapid cooling (1-1000 K/s), chemically partitions into two or more phases, one being an amorphous matrix and the other(s) being crystalline inclusions.

In principle, metallic glasses possess a number of useful material properties that can allow them to be implemented as highly effective engineering materials. For example, metallic glasses are generally much harder than conventional metals, and are generally tougher than ceramic materials. BMGs are also relatively corrosion resistant, and, unlike conventional silicate glass, they can have good electrical conductivity. Importantly, the manufacture of metallic glass materials lends itself to relatively easy processing and, in particular, the manufacture of a metallic glass can be compatible with an injection molding process or any similar casting process. Other metallic glass manufacturing processes include physical vapor deposition, solid-state reactions, ion irradiation, and mechanical alloying.

Metal additive manufacturing, also commonly known as metal 3D printing, is an emerging manufacturing technology, which is being rapidly integrated into commercial applications, such as fabrication of nozzles in aircraft and rocket engines. Typically, a 3D printing process comprises sequential deposition of a multitude of thin layers of a material to assemble a desired bulk part or structure. The most common forms of metal additive manufacturing are powder bed fusion and directed energy deposition. Other emerging techniques include thermal spray additive manufacturing, laser foil welding, fused filament fabrication, binder jetting, direct metal jetting, and ultrasonic additive manufacturing. Recently, it has been shown that bulk metallic glass parts can also be fabricated by additive manufacturing using a variety of methods.

SUMMARY OF THE INVENTION

Embodiments of the invention are directed to bulk amorphous metal materials and parts with improved toughness and methods of manufacture thereof from hypoeutectic bulk amorphous metal materials.

Many embodiments are directed to methods of additive manufacturing a bulk amorphous metal part including:
  providing a metallic glass forming alloy based on a metallic glass-forming alloy system with two or more components where a eutectic exists between two of the components that results in a eutectic metallic glass forming alloy having a critical casting thickness, and wherein the amount of at least the most abundant component of the metallic glass-alloy system is increased at the expense of the sum of the other components such that the metallic glass forming alloy is hypoeutectic and has a critical casting thickness less than the eutectic metallic glass forming alloy;
  disposing molten layers of the hypoeutectic metallic glass forming alloy atop one another additively, and allowing said layers to cool to a bulk amorphous metal part having an amorphous fraction of at least 10% by volume, having an overall thickness of at least 1 mm; and
  wherein the most abundant component of the metallic glass forming alloy comprises at least 70% atomic the metallic glass forming alloy.

In other embodiments, the metallic glass forming alloy is heated to above its melting temperature and then cooled at an initial cooling rate faster than 1,000 K/s such that each layer being disposed cools sufficiently rapidly so as to form at least a partially amorphous metal layer.

In still other embodiments, the additive manufacturing process is selected from the group of powder bed fusion, directed energy deposition, electron beam melting, wire-fed melting, fused deposition modeling, thermal spray additive manufacturing, laser foil printing, molten metal printing, ultrasonic additive manufacturing, and drop on demand printing.

In yet other embodiments, the metallic glass forming alloy of the bulk amorphous metal part has a fragility at least 5% higher as measured through differential scanning calorimetry than that of the eutectic metallic glass forming alloy using the same primary two components.

In still yet other embodiments, the eutectic metallic glass forming alloy has a critical casting thickness of greater than 1 mm, and the metallic glass forming alloy has a glass forming ability less than approximately 1 mm.

In still yet other embodiments, the metallic glass forming alloy of the bulk amorphous metal part has a shear modulus at least 5% lower than that of the eutectic metallic glass forming alloy.

In still yet other embodiments, the metallic glass forming alloy has a composition that is at least 5% different in the amount of the primary component from the eutectic metallic glass forming alloy.

In still yet other embodiments, the disposition is conducted under an inert gas.

In still yet other embodiments, the metallic glass forming alloy is combined with a crystalline phase to form a composite which when deposited alters the fracture toughness of the bulk amorphous metal part as compared to a bulk amorphous metal part formed using a fully amorphous metallic glass forming alloy.

In still yet other embodiments, the metallic glass forming alloy and the crystalline phase are in the form of powders with a size distribution within 10% of each other.

In still yet other embodiments, the metallic glass forming alloy and the crystalline phase have different melting temperatures such that during disposition of the metallic glass forming alloy melts and the crystalline phase at most partially melts.

In still yet other embodiments, the bulk amorphous metal part the metallic glass forming alloy and crystalline phase have at least 5% ductility in a tension test.

In still yet other embodiments, the notch toughness of the bulk amorphous metal part is at least 60 MPa m$^{1/2}$ as measured on a notched 3 mm thick sample using standard three-point-bending toughness measurements with a 100 micrometer root radius notch.

In still yet other embodiments, Zr is the most abundant component of the metallic glass forming alloy.

In still yet other embodiments, the metallic glass forming alloy contains Zr—Cu—Ni—Al and has a concentration of zirconium 70-85%, nickel 5-15%, copper 1-5% and Al 2-7% in atomic percentages.

In still yet other embodiments, the metallic glass forming alloy is a metallic glass-forming alloy system selected from the group of Zr—Cu—Al—X, Zr—Al—X, Pt—Cu—P—X, Pt—P—X, Pt—Si—B—X, Pd—P—X, Ni—Ti—Zr—X, Fe—P—X, Fe—B—X, Ti—Zr—X, Ti—Cu—X, where X is one or more optional additional component elements.

In still yet other embodiments, the metallic glass forming alloy is selected from one of the following: has at least 77% atomic of platinum, has at least 80% atomic of palladium, has at least 60 atomic % of copper, has at least 75% atomic of nickel, has at least 80% atomic of iron, has at least 50% atomic of titanium, has at least 80% atomic of gold, has at least 88% atomic of aluminum, has at least 62% atomic of hafnium, or has at least 50% atomic of tantalum.

In still yet other embodiments, the amount of the most abundant metal in the metallic glass forming alloy is at least 5% atomic more than the amount in a metallic glass forming alloy made from the same constituents but with the highest possible glass forming ability.

In still yet other embodiments, the bulk amorphous metal part has a relative density compared to the solid of at least 99.5%.

In still yet other embodiments, the fragility of the metallic glass forming alloy selected for disposition is at least 50.

In still yet other embodiments, the thickness of each disposed layer is between 1-250 micrometers.

In still yet other embodiments, the metallic glass forming alloy is consolidated during disposition as an amorphous feedstock material that is amorphous and retains the amorphous character and high toughness after disposition.

In still yet other embodiments, the additive disposition process is selected from the group consisting of cold spraying, ultrasonic additive manufacturing, binder jetting, sintering, metal injection molding, and powder consolidation.

In still yet other embodiments, the amorphous feedstock material is in a form selected from the group consisting of wire, sheet and ribbon.

In still yet other embodiments, the method further includes allowing each disposed layer to cool prior to disposition of a further layer thereon.

In still yet other embodiments, each disposed layer is allowed to cool sufficiently to prevent annealing of said disposed layer during disposition of a layer thereon.

In still yet other embodiments, the disposing includes one of either extending the time between the disposition of each layer, or increasing the rate of heating of each layer.

In still yet other embodiments, the most abundant metal of the metallic glass-forming alloy comprises up to the three most abundant metals of the metallic glass-forming alloys.

In still yet other embodiments, the amount of the most abundant metal is increased at the expense of metals of the metallic glass forming alloy to the right of the most abundant metal on the periodic table.

In still yet other embodiments, the bulk metallic part is selected from the group of gears, strain wave gears, knives, cutting tools, bearings, inserts, fasteners, mechanisms, golf clubs, electronic casings, watches, structural coatings, springs, brackets, spacecraft components, and jewelry.

Many other embodiments are directed to methods of additive manufacturing a bulk amorphous metal part including:
   providing a metallic glass forming alloy based on a metallic glass-forming alloy system with two or more components where a eutectic exists between two of the components that results in a eutectic metallic glass forming alloy having a critical casting thickness, and wherein the amount of at least the most abundant component of the metallic glass-alloy system is increased at the expense of the sum of the other components such that the metallic glass forming alloy is hypoeutectic and has a critical casting thickness less than the eutectic metallic glass forming alloy;
   disposing molten layers of the hypoeutectic metallic glass forming alloy atop one another additively, and allowing said layers to cool to a bulk amorphous metal part having an amorphous fraction of at least 10% by volume, having an overall thickness of at least 1 mm; and
   wherein the most abundant component of the metallic glass forming alloy comprises at least 70% atomic the metallic glass forming alloy.

Still many other embodiments are directed to methods of additive manufacturing a bulk amorphous metal part including:
   providing a metallic glass forming alloy based on a metallic glass-forming alloy system with at least one component from the early transition metals and at least one other component from the non-early transition metals where a eutectic exists between the at least two components that results in a eutectic metallic glass forming alloy having a critical casting thickness, and wherein the amount of at least the components from the early transition metals of the metallic glass-alloy system are increased at the expense of the sum of the other components such that the metallic glass forming alloy is hypoeutectic and has a critical casting thickness less than the eutectic metallic glass forming alloy;

disposing molten layers of the hypoeutectic metallic glass forming alloy onto a build plate atop one another additively, and allowing said layers to cool to a bulk amorphous metal part having an amorphous fraction of at least 10% by volume, having an overall thickness of at least 1 mm, and having a density of at least 99.8%;

wherein the disposition occurs at a rate to prevent annealing of each disposed layer by the disposition of an overlaid layer; and wherein the early transition metal components of the metallic glass forming alloy comprise at least 70% atomic the metallic glass forming alloy.

In other embodiments, the disposing includes one of either extending the time between the disposition of each layer, or increasing the rate of heating of each layer to prevent annealing of each disposed layer during disposition of the overlaid layer.

In still other embodiments, the method includes heating the build plate to within 10% of the glass transition temperature of the metallic glass-forming alloy.

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

These and other features and advantages of the present invention will be better understood by reference to the following detailed description when considered in conjunction with the accompanying data and figures, wherein:

FIG. 3B provides a table of physical properties for exemplary alloys in accordance with embodiments of the invention.

FIGS. 6A and 6B provide tables providing properties of exemplary alloys in accordance with embodiments of the invention.

FIGS. 14A to 14-H provide tables of properties for hypoeutectic metallic glass materials in accordance with embodiments of the invention.

FIGS. 14I-1 and 14I-2 provide tables of properties for hypoeutectic metallic glass materials in accordance with embodiments of the invention.

DETAILED DISCLOSURE

Figure 1A:
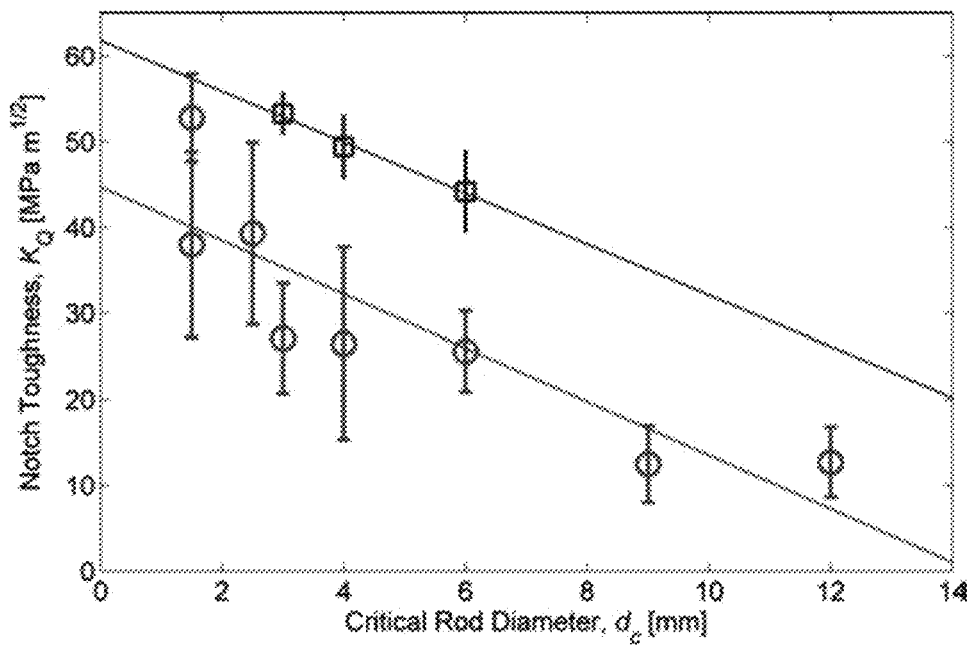
FIG. 1A provides plots of notch toughness vs. critical rod diameter for exemplary alloys according to the prior art.

Turning to the drawings and data, systems and methods for developing tough hypoeutectic amorphous metal-based materials for additive manufacturing, and methods of additive manufacturing using such materials are provided. It will be understood that the embodiments of the invention described herein are not intended to be exhaustive or to limit the invention to precise forms disclosed. Rather, the embodiments selected for description have been chosen to enable one skilled in the art to practice the invention.

Amorphous metals, also known as metallic glasses, are relatively new materials possessing a unique combination of advantageous properties that makes them attractive candidates for a wide variety of applications, including gears, strain wave gears, and other useful parts and mechanisms. (See, e.g., U.S. patent application Ser. Nos. 13/928,109; 14/177,608; 14/259,608; 14/491,618; 15/062,989; and Ser. No. 15/918,831, the disclosures of which are incorporated herein by reference.) For example, these materials typically exhibit excellent corrosion and wear resistance, high strength and high hardness, yet, simultaneously, substantial elasticity. Moreover, manufacturing of parts from metallic glass alloys is, in principle, compatible with such straightforward processes as injection molding or similar casting processes. However, forming of amorphous metals into useful parts remains challenging, especially in the production of parts with dimensions exceeding 1 mm, due to the limitations associated with the need for extremely high cooling rates necessary for quenching of the metallic glass melts into vitreous state, wherein the glassy melt must be solidified faster than competing crystallization can occur. Therefore, bulkier (thicker) parts, which require longer time to fully cool and solidify, are more difficult to manufacture without loss of advantageous properties afforded by the glassy phase.

One parameter used to characterize the glass forming ability (GFA) of an alloy is the "critical rod dimeter" ($d_c$), wherein the better glass formers are able to yield thicker (i.e. having larger critical rod diameters), fully amorphous parts at a given cooling rates. Another way of framing the glass forming ability of an amorphous metal is by the minimum cooling rate required for material to form an amorphous phase, this "critical cooling rate" determines the types of manufacturing processes available. For example, very poor glass forming materials can have critical cooling rates as high as $10^{6\circ}$ C./s. Another parameter that relates to the glass forming of a material is fragility. Fragility characterizes how rapidly the dynamics of a material slow down as it is cooled toward the glass transition: materials with a higher fragility have a relatively narrow glass transition temperature range, while those with low fragility have a relatively broad glass transition temperature range. The most common definition of fragility is the "kinetic fragility index" m, which characterizes the slope of the viscosity (or relaxation time) of a material with temperature as it approaches the glass transition temperature from above. Physically, fragility may be related to the presence of dynamical heterogeneity in glasses, as well as to the breakdown of the usual Stokes-Einstein relationship between viscosity and diffusion.

When a material is placed under stress and has reached the limit of its strength, it usually has the option of either deformation or fracture. A number of parameters may be used to describe the strength of a metallic glass when placed under stress, including: toughness, brittleness, fragility, etc. Toughness is the ability of a material to absorb energy and plastically deform without fracturing. One definition of material toughness is the amount of energy per unit volume that a material can absorb before rupturing. It is also defined as a material's resistance to fracture when stressed. Toughness generally requires a balance of strength and ductility. In general terms, a material is considered brittle if, when subjected to stress, it breaks without significant plastic deformation. Brittle materials absorb relatively little energy prior to fracture, even those of high strength.

Figure 1B:
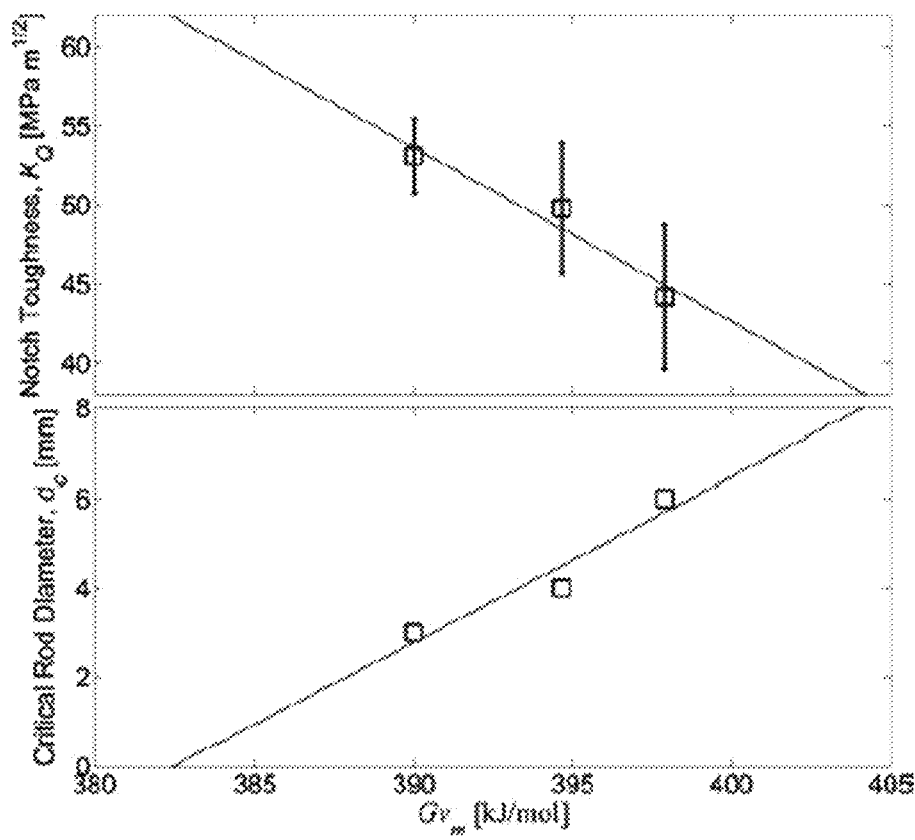
FIG. 1B provides plots of notch toughness and critical rod diameter vs. shear modulus for exemplary amendment according to the prior art.

One approach to improving glass forming ability and increasing critical rod diameter of metallic glass alloys is to dilute the alloy's predominant/base metal (M) with other metal or non-metal elements, thus, decreasing the alloy's overall propensity for metallic crystallization. The basic strategy is to move the composition closer to a eutectic point, where a deep melting temperature allows for more rapid cooling to form a glass. However, the better glass formers (with thicker critical rod diameters at the expense of lower main metal content) resulting from this approach typically make less tough materials. For example, FIG. 1A demonstrates that, for a given chemical family of alloys, the material toughness declines roughly linearly with the increase in critical rod diameter (i.e. glass forming ability). Furthermore, FIG. 1B demonstrates that the shear modulus (G, which is the deformation of a solid when it experiences a force parallel to one of its surfaces while its opposite face experiences an opposing force) and the barrier to shear flow (W), which are the intrinsic parameters that govern the toughness of metallic glasses, wherein W is proportional to G, are also dependent on the alloy's glass forming ability/critical rod diameter.

Alternatively, in instances when the toughness of the material cannot be compromised, the manufacturing of metallic glass parts must rely solely on fast cooling processes, such as, for example, one of: die casting, injection molding, melt spinning, thermal spraying, atomization, suction casting, arc melting, and induction melting. Recently, additive manufacturing processes (known as 3D printing) have also been utilized to form bulk amorphous metals parts. For example, 3D printing processes such as powder bed fusion, thermal spray additive manufacturing, laser foil welding, direct metal laser sintering, directed energy deposition, fused filament fabrication, liquid jetting, and ultrasonic additive manufacturing have all been used to manufacture bulk metallic glass parts. Notably, in the manufacturing of parts from metallic glass alloys, most additive manufacturing techniques offer significant advantages over casting methods, because the overall part is formed from a plurality of discrete layers, wherein each layer can potentially have a thickness (as low as 250 microns or less) that is less than the critical rod diameter of a given metallic glass alloy. Coincidently, printing thinner layers enables much faster per-layer cooling rates. Specifically, in most standard 3D printing processes, a layer can be cooled at a rate as fast as between 1,000 to 100,000 K/s, which is fast enough to print a fully amorphous metallic glass layer even from a metallic glass alloy with a critical rod dimeter of less than 1 mm. Accordingly, it has been shown that 3D printing techniques allow for manufacturing of fully amorphous metallic glass parts in overall thicknesses that might exceed the glass forming ability of a given alloy (and, therefore, cannot be achieved by casting methods), without any compromise to the physical and mechanical properties of the alloys, including toughness.

Nevertheless, in general and regardless of the manufacturing method, the toughness of metallic glass alloys parts is typically inferior to that of many other high performance conventional metallic alloys that can also be used in 3D printing, such as, for example, aluminum, titanium, steel, Inconel, nickel, or even certain metal matrix composites. Specifically, BMGs are notoriously brittle in tension tests and have moderate to low resistance to fracturing in bending. Therefore, it is highly desirable to develop amorphous metal alloys that are both amenable to 3D printing and have a well-balanced combination of physical and mechanical properties, including both high strength and at least moderate toughness as measured through notch toughness measurements or bending tests. More specifically, it is desirable to develop a metallic glass alloys with a notch toughness of at least 60 MPa m$^{1/2}$ or above, which would be a sufficient toughness for a BMG part to be useable in structural applications without being too brittle. Specifically, the toughness of at least 60 MPa m$^{1/2}$ or greater is large enough to ensure that the part is sufficiently ductile in bending to be useful in a wide assortment of components. In other words, a four point bending tests of a BMG produced according to the disclosed method would exhibit plasticity in bending prior to failure. For example, a bulk amorphous metal part with a toughness greater than 60 MPa m$^{1/2}$ can be bent permanently in a rod of up to 4 mm in diameter as measured using a standard three-point-bending toughness measurements with a 100 micrometer root radius notch.

However, although cast BMG parts have been shown to have notch toughness above the 60 MPa m$^{1/2}$, no additively manufactured BMG part has featured toughness that is above this threshold. Accordingly, although it has been shown that additive manufacturing techniques, wherein a part is constructed from a multitude of thin, rapidly coolable layers, can be used with alloys that are poor glass formers to ultimately produce a fully amorphous bulk part with a thickness larger than one that could be cast from the same alloy, these prior attempts have always focused on achieving larger part thicknesses without loss of the amorphous phase (i.e. on preserving properties afforded by the amorphous phase) and never on improving any particular physical property of the alloy. For example, it has been shown that 3D printing can be used to make amorphous parts from inexpensive Fe-based alloys that cannot be cast to the same thickness. As such, 3D printed BMG parts reported to date typically have roughly the same physical properties as equivalent cast BMG parts (assuming the alloy can be cast at all), including inferior toughness. The prior art has demonstrated that metallic glass alloys that are already known from casting or coating have been successfully printed but no attempts to customize the alloy composition specifically for improving the properties of the printed parts has been demonstrated. The current disclosure is the first to suggest that the properties of printed BMGs can be improved by modifying well-known alloys specifically for printing. The prior art has focused on simply printing alloys that are known from previous work in casting, which has resulted in properties that are far from what can be optimally achieved with the alloy design strategy disclosed here.

Embodiments of Hypoeutectic Amorphous Metal-Forming Alloys

The current application is directed to embodiments of methods and systems of amorphous metal-forming alloys for fabrication of bulk amorphous metal parts via additive manufacturing with enhanced material properties (e.g., toughness) by modifying alloys away from well-known eutectic compositions with good glass formation and into hypoeutectic regions with lower glass forming ability but higher toughness. In many embodiments, the methods may take advantage of very fast rates of cooling afforded by the 3D printing of discrete thin layers during the assembly of bulk parts from metallic glass alloys with compositions selected to improve toughness at the expense of glass forming ability (FIGS. 2A and 2B) while maintain at least a partial amorphous character of the alloy (e.g., an amorphous fraction of at least 10% by volume for a part having an overall thickness of 1 mm). For example, in many embodiments, the cooling rate of a single 3D printed layer (which may be, for example, 250 microns or less) is at least 1,000 K/s or faster (FIG. 2A).

Figure 2A:
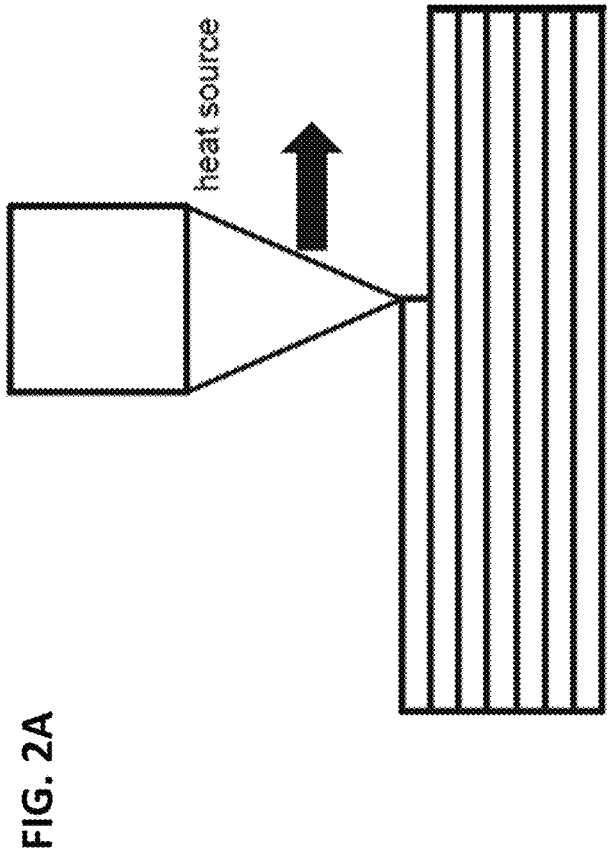
FIGS. 2A and 2B provide schematics of a process for additive manufacturing of amorphous based metal materials in accordance with embodiments of the invention.
Figure 2B:
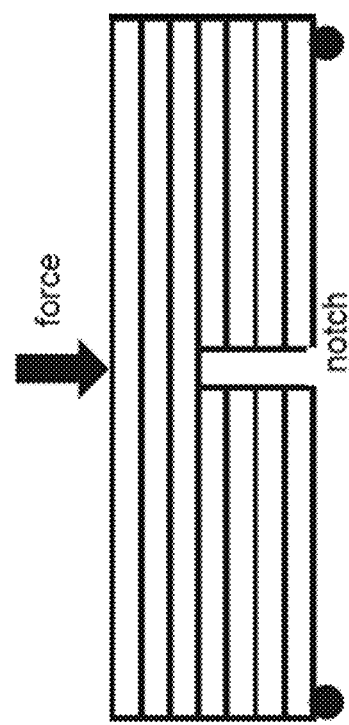

In many embodiments, the metallic glass alloy used in manufacturing of a bulk part is selected to have minimal glass forming ability for the per layer cooling rate afforded by the manufacturing process (FIG. 2A). In many embodiments, the metallic glass alloys used in embodiments are specially composed for high toughness. In many such embodiments, the alloy is a hypoeutectic metallic glass alloy and comprises higher main metal content than the corresponding eutectic composition. In many such embodiments, the hypoeutectic is formed by increasing the amount of at least the most abundant component of the metallic glass-alloy system at the expense of the sum of the other components. In various such embodiments the composition is at least 5% different in the amount of the primary component from the eutectic metallic glass forming alloy.

Furthermore, in many embodiments, bulk amorphous metal glass parts are 3D printed from hypoeutectic alloys with inferior glass forming ability as compared to an alloy with the same elements but nearer to the eutectic composition, such that the resulting parts possess higher toughness than the nearest analog parts cast from the alloys with acceptable glass forming ability. In many such embodiments the notch toughness of parts additively manufactured from metallic glass materials according to the methods of the application is at least 60 MPa m$^{1/2}$ (FIG. 2B) as measured on a notched 3 mm thick sample using a standard three-point-bending toughness measurements with a 100 micrometer root radius notch. In many such embodiments, the glass forming ability of an alloy is sacrificed (in order to improve its toughness) by increasing the content of the main metal or the main two to three metals in the alloy's composition. In many embodiments, such composition adjustments dramatically increase both the fragility and toughness of a given alloy, along with decreasing its glass forming ability down to below the thickness where it can be directly cast into bulk parts. Therefore, in many embodiments, additive manufacturing is, in turn, used to compensate for the poor glass forming ability of such tough hypoeutectic alloys by printing very thin (thinner than the critical rod diameter) discrete layers amenable to very fast cooling and further assembly into bulk fully amorphous parts. Consequently, in many embodiments, the weak glass forming but extremely tough hypoeutectic metallic glass alloys formulated according to the methods of the application are used in appropriate combination with additive manufacturing techniques to fabricate bulk amorphous metal parts that have toughness greater than any equivalent or nearest equivalent cast parts made from the same constituent materials. In many embodiments, the methods of the application are globally applicable across all bulk glass forming alloy families, because the physics of fragility and off eutectic glass formation are universal.

Embodiments of Methods for Selecting Amorphous Metal Alloy Compositions

Many embodiments comprise an alloy based on a metallic glass forming alloy system with at least one component from the early transition metals and at least one other component from the non-early transition metals, where a eutectic exists between the at least two components that results in a eutectic metallic glass forming alloy having a critical casting thickness. The toughness of metallic glass alloys selected for the additive manufacturing of tough parts is enhanced according to embodiments by increasing the content of the main metal (i.e., the metal with the highest concentration), or the main two to three metals (i.e., the metals with the highest few concentrations), within the alloys' compositions at the expense of the other, glass formation enhancing, elements to form a hypoeutectic alloy material. Typically, this would entail decreasing the amount of the late transition metal or the metalloids in the alloy composition in favor of the early transition metal atoms. However, it could also entail decreasing the amount of non-metallic elements in favor of the metallic ones, as in the case of increasing the compositional content of Au, Pd, Pt, Ag at the cost of P, B, Si, C, Be, for example. It could also entail increasing the amount of elements such as Zr, Ti, Hf, Nb, V, Ta at the cost of Cu, Ni, Al, Be, B, P, Si, C, etc.

Figure 3A:
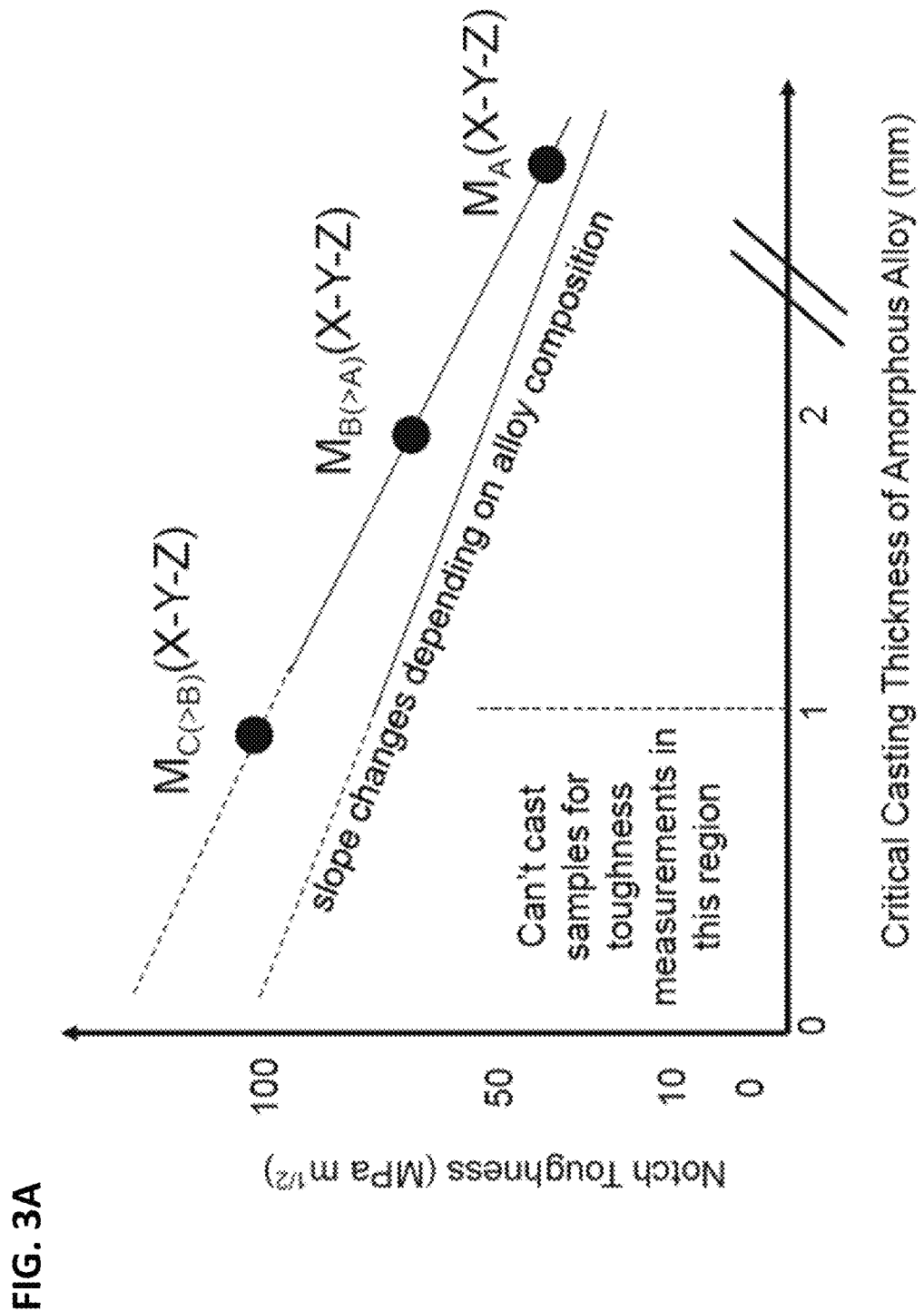
FIG. 3A provides schematic plots of notch toughness to critical casting thickness in accordance with embodiments of the invention.

In general, as is known in the art and illustrated by FIG. 3A, increasing the main metal (M) content (A, B, C) at the expense of other alloy components (X, Y, Z) typically decreases the alloys' glass forming ability (GFA) and increases its fragility and, therefore, increases its toughness. This can also be thought of differently as shifting the composition away from the lowest melting point, or eutectic composition, of the alloy towards a higher melting temperature, more metal-rich region. Here, it should be noted that, since it is difficult to obtain cast samples for alloys with critical rod diameter of less than 1-2 mm (such as the alloys of this application), the toughness of bulk parts made from such alloys is very difficult or even impossible to measure directly using standard mechanical tests. However, multiple indirect studies indicate that the trend, wherein the alloy's toughness increases with decreasing critical rod diameter within a single alloy compositional family, continues past the critical rod diameter values that allow casting of bulk parts for mechanical measurements. In addition to mechanical properties, such as toughness, physical properties of the glass, such as fragility, also increase with decreasing critical rod diameter in a single family.

As a specific example, the table in FIG. 3B illustrates the dependence of GFA/critical rod diameter on the concentration of M for an alloy system of Zr—Cu—Al—Ni alloys (M=Zr). FIG. 3B shows that the GFA quickly diminishes (from $d_c$ of over 10 mm to −5 mm) as Zr content is increased (from 53-57 atomic percent to 70 atomic percent). Furthermore, it is expected that in any alloy family the alloy with the highest M content ($Zr_{70}$) will have the highest toughness, as demonstrated in the series presented in FIG. 3B. Accordingly, in various embodiments the alloys are selected from the group of alloy families Zr—Cu—Al—X, Zr—Al—X, Pt—Cu—P—X, Pt—P—X, Pt—Si—B—X, Pd—P—X, Ni—Ti—Zr—X, Fe—P—X, Fe—B—X, Ti—Zr—X, Ti—Cu—X, where X is one or more optional additional elements. In other such embodiments Zr is the most abundant component of the metallic glass forming alloy. In other embodiments the metallic glass forming alloy contains Zr—Cu—Ni—Al. In some such embodiments the alloy has a concentration of zirconium 70-85%, nickel 5-15%, copper 1-5% and Al 2-7% in atomic percentages. In various other embodiments the metallic glass forming alloy is selected from one of the following: has at least 77% atomic of platinum, has at least 80% atomic of palladium, has at least 60 atomic % of copper, has at least 75% atomic of nickel, has at least 80% atomic of iron, has at least 50% atomic of titanium, has at least 80% atomic of gold, has at least 88% atomic of aluminum, has at least 62% atomic of hafnium, or has at least 50% atomic of tantalum. In some such embodiments the amount of the most abundant metal in the metallic glass forming alloy is at least 5% atomic more than the amount in a metallic glass forming alloy made from the same constituents but with the highest possible glass forming ability.

Figure 4:
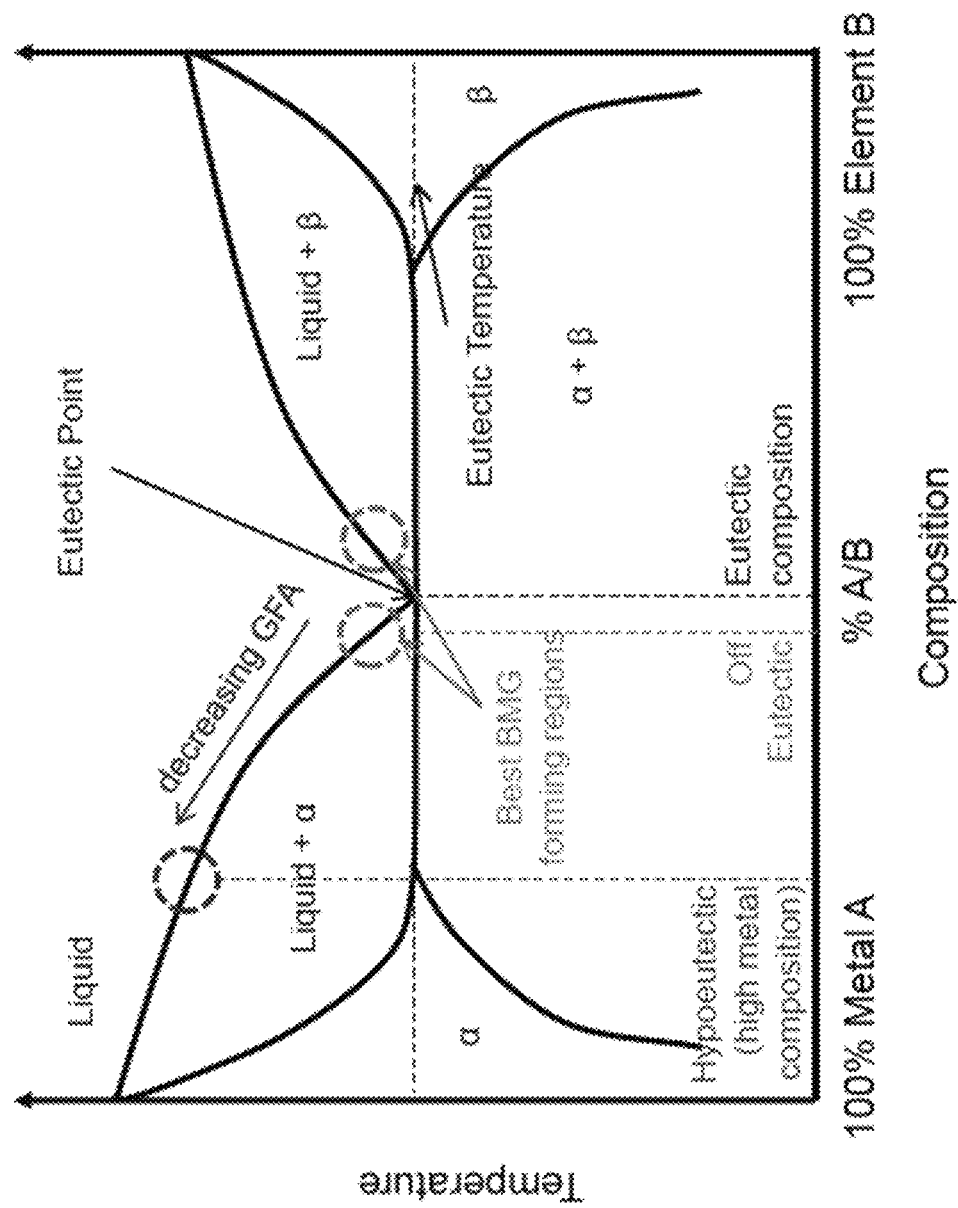
FIG. 4 provides a schematic of properties for metallic glasses for use in accordance with embodiments of the invention.

In short, alloy selection for 3D printing of tough bulk amorphous parts according to the embodiments and methods of the application are contrary to convention. To this end, FIG. 4 illustrates a phase diagram for a hypothetical metallic glass alloy composition comprised of 2 elements—metal A and another (metal, non-metal, or metalloid) element B in accordance with embodiments. As shown in FIG. 4, the eutectic point is the metallic glass alloy composition at which, upon cooling, the material directly transitions from the liquid to the amorphous phase, completely avoiding crystallization. Therefore, alloys with eutectic or near eutectic compositions are the best glass formers (i.e., are the least sensitive to cooling rates). As such, moving away from a eutectic composition must be compensated with an increase in the cooling rate, so as to avoid crystallization of upon cooling. In addition to having the best glass forming abilities, the alloys with compositions near the eutectic point also have lower fragility, and are subsequently more brittle. Moving to the opposite side of the phase diagram to the hypereutectic compositions further decreases the fragility and leads to the most brittle glasses. In conventional teachings, metallic glass materials are selected to be as close to the eutectic as possible to maximize the glass forming properties, while still being tougher than the hypereutectic compositions. Accordingly, in many embodiments, the alloys of the instant applications have a hypoeutectic composition (i.e. a composition that is richer in the main metal than the corresponding eutectic composition), and are, thus, poorer glass formers (with critical rod diameter of equal to or less than 1 mm), requiring higher cooling rates to achieve fully amorphous state. In many such embodiments the hypoeutectic alloy has a composition that is at least 5% different in the amount of the primary component from the eutectic metallic glass forming alloy.

Furthermore, the hypoeutectic alloys of the instant application demonstrate higher fragility and toughness (when produced in bulk through additive manufacturing), as compared to their eutectic counterparts, produced through the same technique. This difference in properties can be expressed and quantified through a number of different physical parameters of the alloys and parts formed from such alloys. For example, in many embodiments the metallic glass forming alloy of the bulk amorphous metal part has a fragility at least 5% higher, as measured through differential scanning calorimetry, than that of the eutectic metallic glass forming alloy using the same primary two components. In some embodiments, the fragility of the metallic glass forming alloy selected for disposition is at least 50. In other embodiments, the metallic glass forming alloy of the bulk amorphous metal part has a shear modulus at least 5% lower than that of the eutectic metallic glass forming alloy. In other such embodiments the bulk amorphous metal part the metallic glass forming alloy and crystalline phase have at least 5% ductility in a tension test. In other embodiments, the notch toughness of the bulk amorphous metal part is at least 60 MPa $m^{1/2}$ as measured on a notched 3 mm thick sample using standard three-point-bending toughness measurements with a 100 micrometer root radius notch.

Figure 5A:
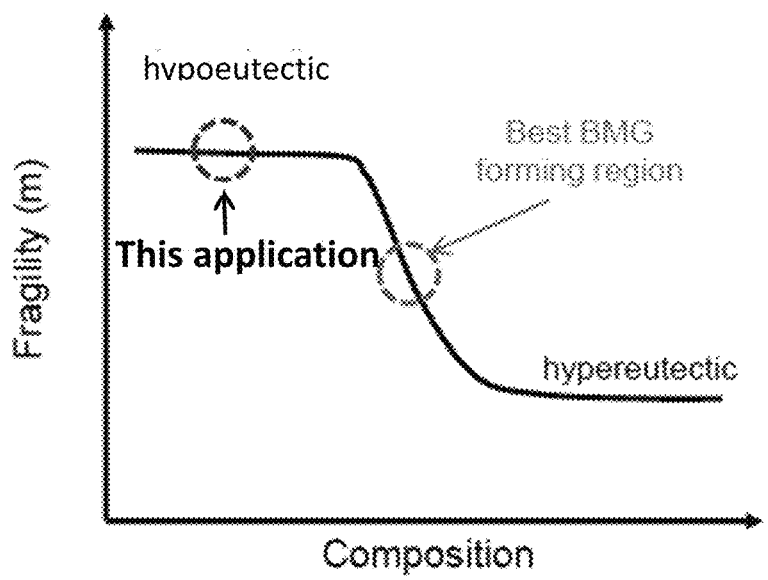
FIGS. 5A to 5C provide schematic plots of of (5A) fragility, (5B) shear modulus and (5C) glass forming ability for compositions for use in accordance with embodiments of the invention.
Figure 5B:
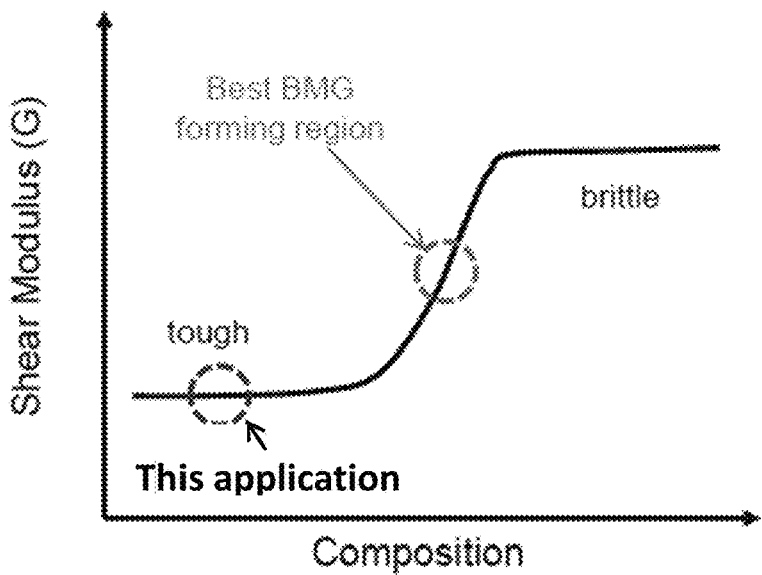
Figure 5C:
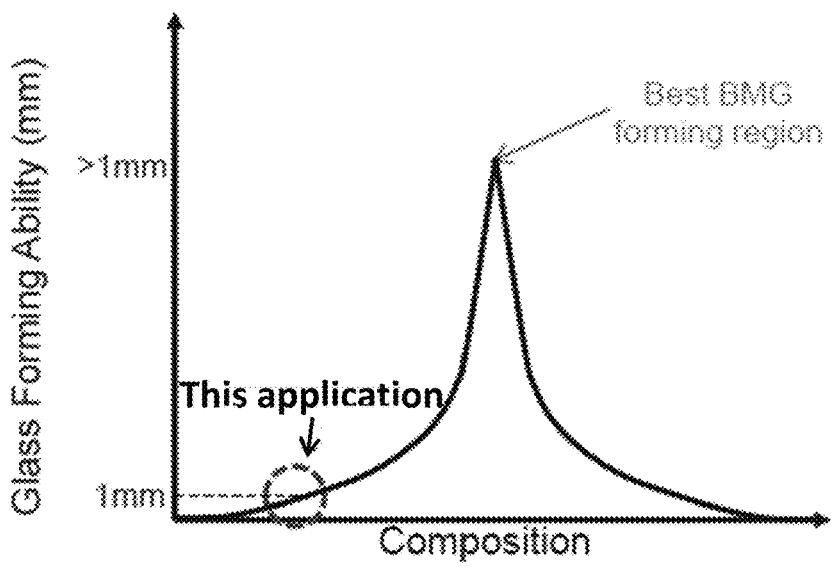
Figure 6C:
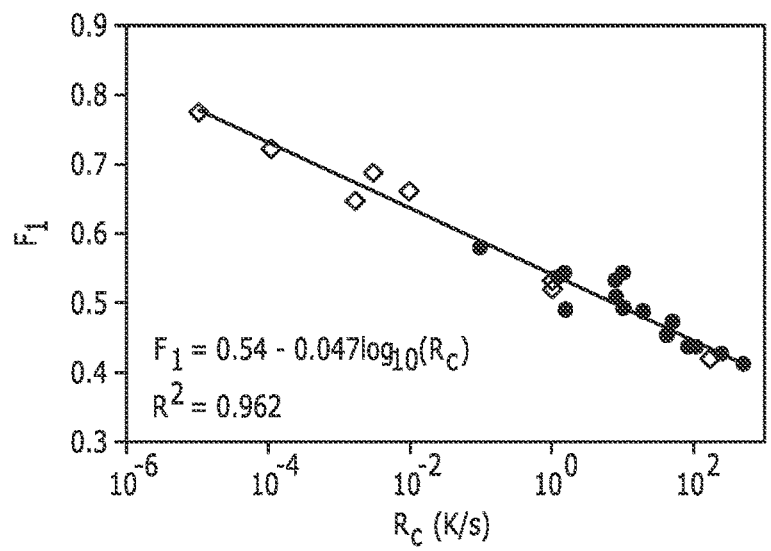
FIGS. 6C to 6E provide plots showing the correlation between fragility and glass forming ability of exemplary metallic glass alloys in accordance with embodiments of the invention.
Figure 6D:
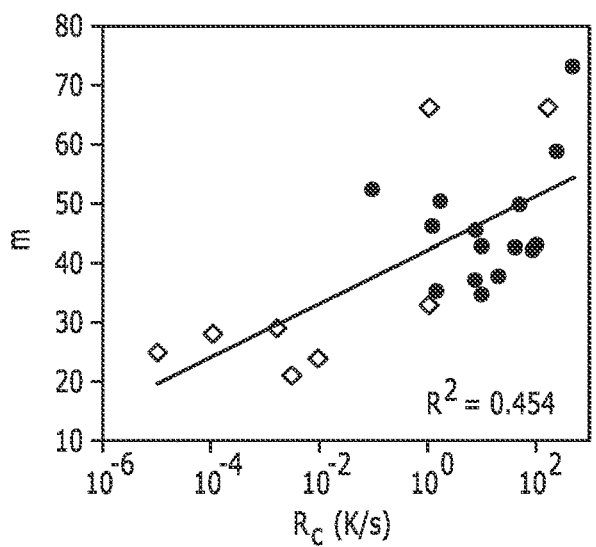
Figure 6E:
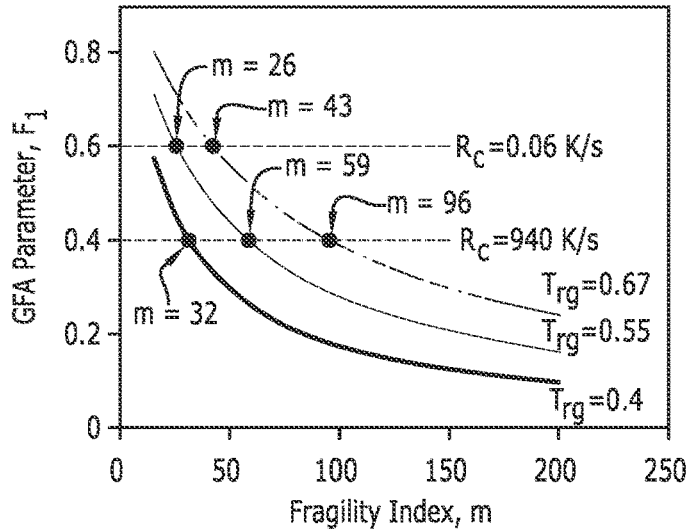

FIGS. 5A through 5C further illustrate the properties expected for the hypoeutectic metallic glass alloys of this application. Specifically, as compared to the corresponding eutectic compositions or even hypereutectic (i.e. containing less of main metal) compositions, alloys of the instant application are expected to have the highest fragility (FIG. 5A), lowest shear modulus G (FIG. 5B), and correspondingly, the highest toughness (FIG. 5B). As a trade-off, the alloys of the application are expected to have a very low glass forming ability, with critical rod diameter of approximately 1 mm or less, which, of course, makes them unacceptable candidates for most forming methods, including casting and molding. For example, in many embodiments where the eutectic metallic glass forming alloy has a critical casting thickness of greater than 1 mm, the metallic glass forming alloy would have a glass forming ability less than approximately 1 mm. However, in many embodiments, the low GFA of the hypoeutectic alloys of the application is compensated by the fast cooling rates afforded by the additive manufacturing techniques employed in the manufacturing of bulk parts according to the methods of the application. Notably, as illustrated by FIGS. 3B, 4 and 5C—going hypereutectic in an alloy composition (i.e. reducing the amount of main metal as compared to the eutectic composition) also reduces the GFA; however, only hypoeutectic alloys are expected to have improved toughness.

It should also be apparent that the designation of 1 mm for the glass forming ability of the hypoeutectic alloy is not critical but rather represents a minimum glass forming ability of the selected additive manufacturing technique. For example, the cooling rate for a specific metal additive manufacturing technique may vary such that the composition of the hypoeutectic BMG may have to be adjusted to better glass formers so as to achieve a glass during printing. Prior art has previously demonstrated that BMGs with glass forming ability of less than 1 mm could successfully be printed fully amorphous using powder bed fusion, laser foil printing, and thermal spray additive manufacturing. The glass forming ability, however, is highly correlated with the oxygen content of the metal powder. For example, a hypoeutectic BMG with a high percentage of oxygen may not have sufficient glass forming ability to be printed amorphous and thus the composition may have to be slightly compensated back towards the direction of the eutectic to achieve a glass during printing.

Figure 7A:
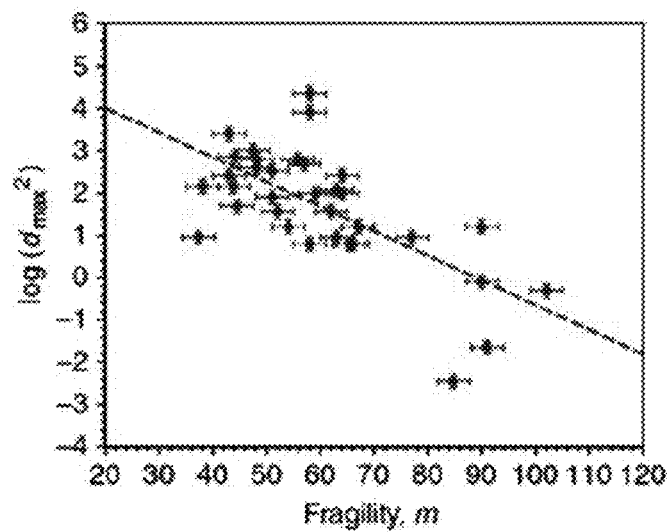
FIGS. 7A and 7B provide plots showing how fragility can be used to predict glass forming ability for exemplary alloys in accordance with embodiments of the invention.
Figure 7B:
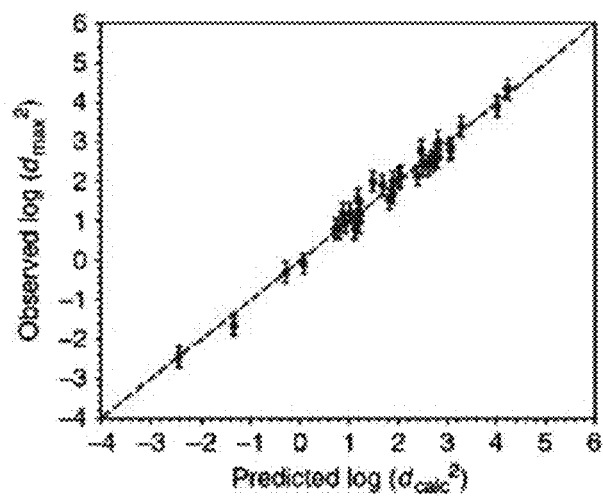

Importantly, in many embodiments, the fragility property may be used to predict the expected GFA and toughness of the hypoeutectic alloys of the instant application and aid in their selection. This criterion, which may be measured or estimate by standard means, is important for the methods of the instant application since the alloys best suited for the methods must have very low GFA, making it hard (if not impossible) to cast them into bulk parts for the applicable measurements. FIGS. 6A through 6E provide tables and plots that demonstrate the relationship between the BMG fragility, GFA, and toughness, and clearly demonstrate that the GFA and toughness of a glass forming alloy can be predicted from fragility or certain fragility dependent parameter measurements. More specifically, these figures demonstrate that the higher fragility in a given alloy family is indicative of lower glass forming ability and tougher bulk parts. More specifically, W. L. Johnson et. al. have conclusively shown with the data plots reproduced in FIGS. 7A and 7B, that fragility and reduced glass transition temperature (Trg), the ratio between the liquidus temperature, and the glass transition temperature can be used to accurately calculate the GFA of alloys that cannot be cast into bulk samples due to poor GFA. (See W. L. Johnson et. al., Nature Communications, 7, Article number: 10313 (2016), the disclosures of which are incorporated herein by reference.))

Figure 8:
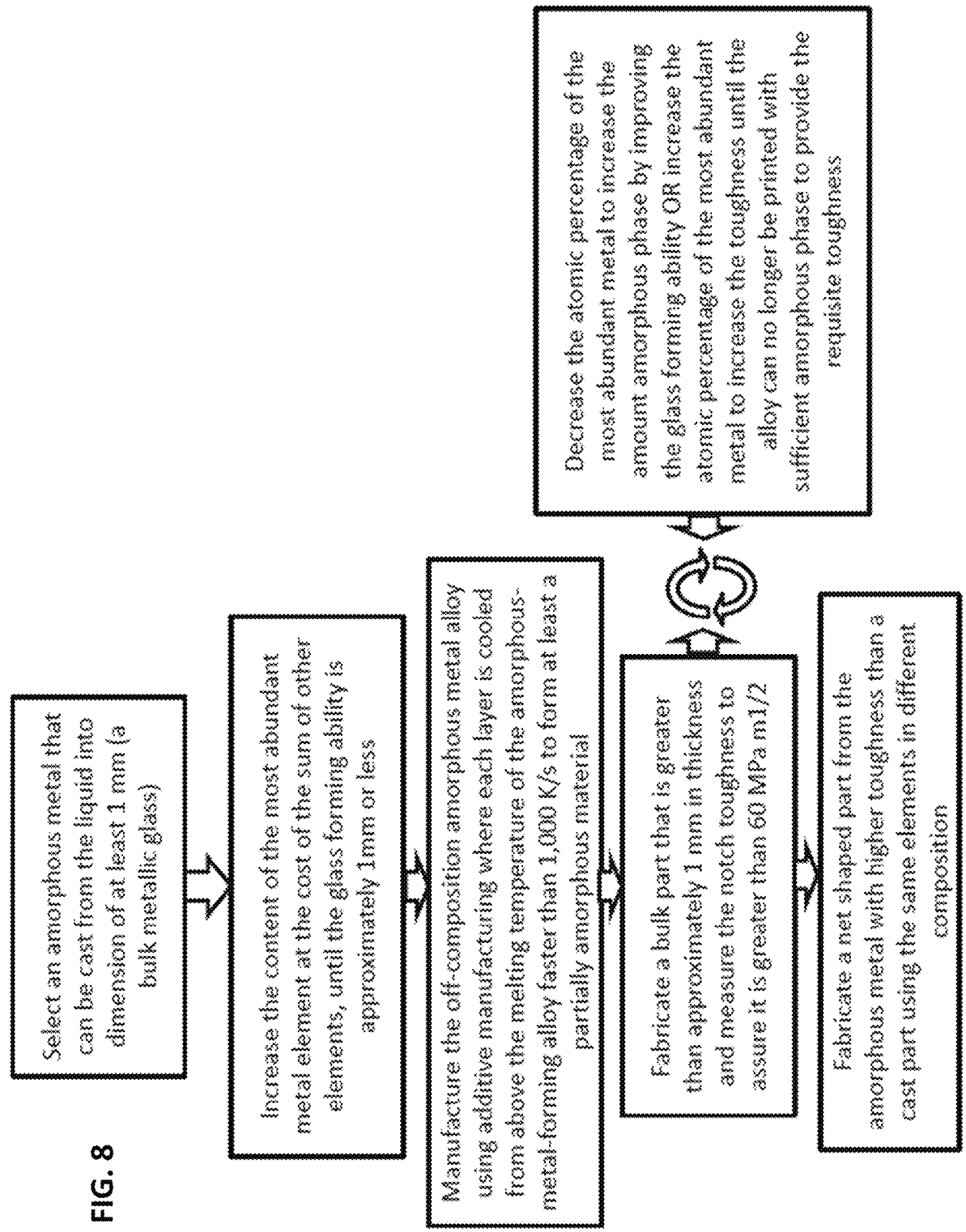
FIG. 8 provides a flow chart of a process for selecting and additively manufacturing metallic glass alloys in accordance with embodiments of the invention.

Accordingly, in many embodiments, the selection process of amorphous metal alloy compositions for additive manufacturing of bulk amorphous parts with superior toughness comprises following the sequence tabulated in FIG. 8. In many embodiments, first, an amorphous metal composition with a critical rod diameter of at least 1 mm and poor to moderate bulk toughness is selected. In many embodiments, the content of the main metal or other metals in the alloy is next increased at the expense of the content of one or more of the other composition elements until the GFA of the alloy reaches approximately 1 mm or less, or similarly approaches the minimum GFA that can be printed in a specific additive manufacturing printer. In many embodiments, the alloy's composition is next adjusted per the toughness test results for the corresponding additively manufactured bulk amorphous part with overall thickness of more than 1 mm. In many such embodiments, following the toughness testing of the bulk part, the alloy's dominant metal content is either further increased to enhance the part's toughness (until the alloy can no longer be printed sufficiently amorphous), or decreased to enhance the glass forming ability (and, consequently, the amount of the amorphous phase).

Forming the alloys in accordance with embodiments may be done in situ in the melt, or ex situ, where the metallic glass forming alloy is combined with a crystalline phase to form a composite which when deposited alters the fracture toughness of the bulk amorphous metal part as compared to a bulk amorphous metal part formed using a fully amorphous metallic glass forming alloy. In some such embodiments the metallic glass forming alloy and the crystalline phase may be provided in the form of powders with a size distribution within 10% of each other. In other such embodiments, the metallic glass forming alloy and the crystalline phase have different melting temperatures such that during disposition of the metallic glass forming alloy melts and the crystalline phase at most partially melts.

In many embodiments, the objective of such alloy composition selection is fabrication of a net shaped amorphous metal part with toughness that is higher than can be achieved for a nearest possible equivalent cast part. The toughness would presumably be the highest for any BMG with the same elements designed around a particular glass-forming composition. It should be noted that several eutectic compositions may exist in a single alloy. For example, the Cu—Zr binary BMG system has three different compositions where BMGs form. In most other BMG systems, there is one particular glass forming eutectic region, which can be used to form a hypoeutectic composition suitable for printing. Using materials according to embodiments, it is possible to form bulk amorphous parts (e.g., having a thickness of at least 1 mm).

Embodiments of Methods for Using Additive Manufacturing

Figure 9:
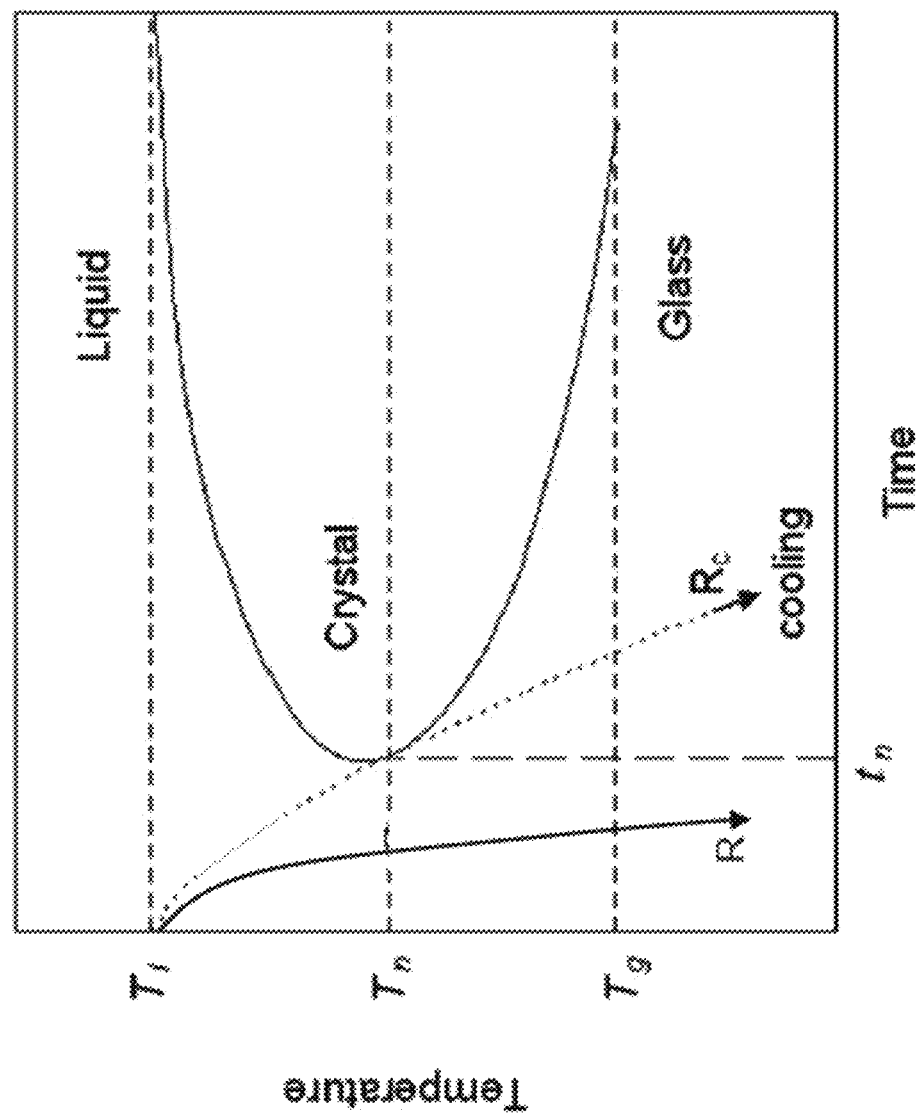
FIG. 9 provides a schematic of a temperature time diagram of the critical cooling rate for forming a metallic glass in accordance with embodiments of the invention.

In many embodiments, the unique features of additive manufacturing are used to compensate for the poor GFA of the alloys of the application to form parts that are tougher than possible using standard forming methods. Specifically, as explained in the diagram provided in FIG. 8 and further illustrated in FIG. 9, in many embodiments, precaution is taken to ensure that each layer of the 3D printed part is cooled faster than the critical cooling rate ($R_c$) of the alloy being printed, in order to avoid crystallization and subsequent loss of advantageous BMG properties of the bulk part. Exemplary additive manufacturing process that may be used with embodiments include powder bed fusion, directed energy deposition, electron beam melting, wire-fed melting, fused deposition modeling, thermal spray additive manufacturing, laser foil printing, molten metal printing, ultrasonic additive manufacturing, and drop on demand printing. Since different 3D printing processes have different maximum per layer cooling rates, care should be taken in matching the desired alloy to the 3D printing technique. For example, the cooling rate of thermal spray additive is among the highest ($\sim 10^6$ K/s), followed by laser foil printing ($\sim 10^5$ K/s), powder bed fusion ($\sim 10^4$ K/s) and directed energy deposition ($\sim 10^3$ K/s). In other words, in many embodiments, the optimal additive manufacturing technique/cooling rate is determined by carefully matching the manufacturing techniques capabilities to the GFA abilities of a given alloy composition. However, in many embodiments, the cooling rate for a single layer is above 1,000 K/s. In many such embodiments the thickness of each disposed layer is between 1 to 250 micrometers. In various other embodiments the bulk amorphous metal part formed using such methods has a relative density compared to the solid of at least 99.5%.

Figure 10A:
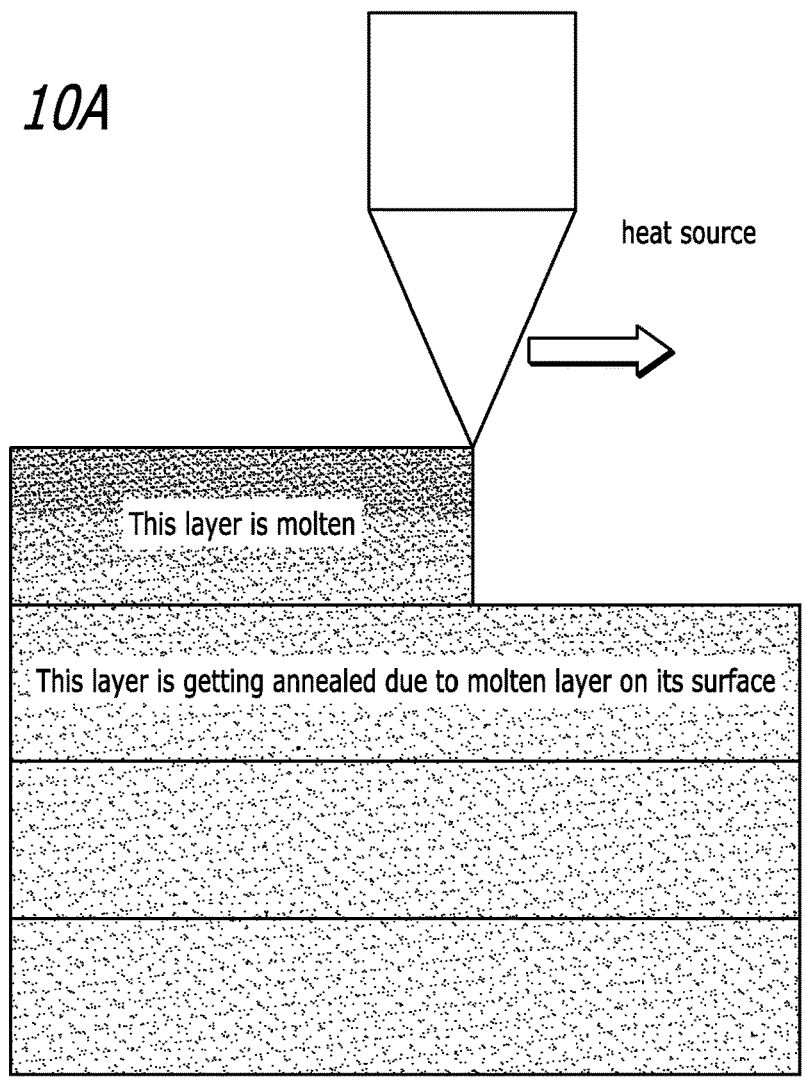
FIGS. 10A and 10B provide schematics of a method for 3D printing metallic glasses (10A), and a diagram showing the relation of the embrittlement of such materials (10B), in accordance with embodiments of the invention.
Figure 10B:
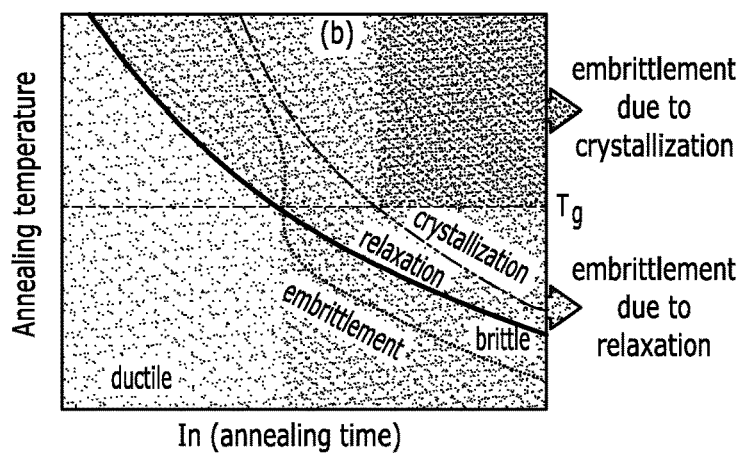

Importantly, in many embodiments, precaution is taken to avoid or minimize alloy embrittlement due to re-crystallization caused by alloy annealing during layer deposition (FIGS. 9, and 10A-10B), and also due to annealing embrittlement of the BMG by changing the glass to a less disordered state, even though it remains a glass. Specifically, despite very fast cooling rates for 3D printed layers, high temperature layer annealing is expected to cause annealing embrittlement or partial crystallization and subsequent brittleness, and, as a result, lower toughness, in the additively manufactured parts (FIGS. 10A and 10B), especially as compared to cast parts. Therefore, in many embodiments, precaution is taken to select an amorphous metal alloy with a high enough expected initial toughness, such that a bulk part can be produced with higher toughness than that available via conventional techniques, despite the detrimental effects of layer annealing during manufacturing. In addition, in many embodiments, precaution is taken to avoid prolonged annealing or annealing above the glass transition temperature of the alloy being deposited for long times, since both conditions might also cause formation of crystalline phases, as shown in FIG. 10B.

For example, in many embodiments the additive manufacturing process may be modified to ensure that there is cooling of the underlying layer prior to deposition of the overlaid layer. In various such embodiments the time between deposition of layers is extended, such as, for example, by pausing the deposition between layers to give the underlying layer time to cool. In other embodiments, the rate of heating and deposition may be increased such that the underlying layers spend less time being heated and thus reducing the chance for annealing. In still other embodiments the build plate may be heated to within 10% of the glass transition temperature of the metallic glass alloy build material to prevent large differences in the temperature between the disposed layer and the layer to be disposed. In many such embodiments the method of disposing molten layers of the hypoeutectic metallic glass comprises cooling the layers forming the bulk amorphous metal part (e.g., a part having an overall thickness of at least 1 mm) such that they maintain an amorphous fraction of at least 10% by volume and a density of at least 99.8%.

Figure 11:
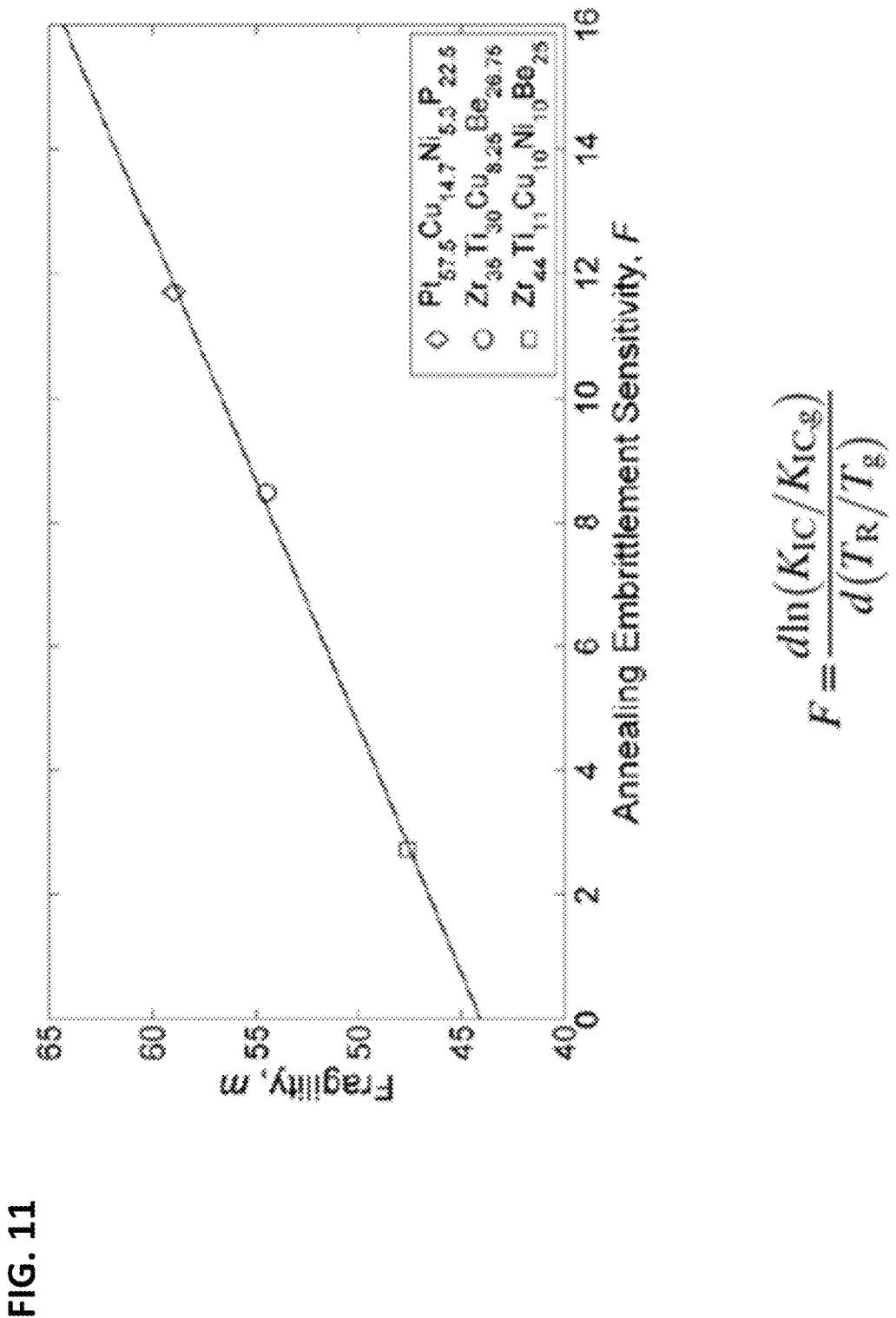
FIG. 11 provides a plot showing the fragility of metallic glasses vs annealing sensitivity in accordance with embodiments of the invention.

FIG. 11 further demonstrates the need to balance the fragility property of an alloy with its sensitivity towards annealing-induced embrittlement, according to the embodiments of the application. Specifically, it has previously been shown that alloys with a good GFA have a higher fragility or fragility-index than the same family alloys with lower GFA. Furthermore, it is also known that amorphous metal alloys can be made tougher by compositional manipulations to increase their fragility, although at the expense of GFA, which diminishes with increased toughness. Unfortunately, as the alloy fragility increases, so does its propensity for annealing embrittlement, as shown in FIG. 11. Therefore, the conventional approach has been to additively manufacture with alloys that are good glass formers to minimize crystallization effects from residual heat build-up during the manufacturing process and accompanying annealing embrittlement, even though the resulting bulk parts are more brittle and lack toughness. However, in contrast, in many embodiments, the methods of the instant application, require exactly the opposite—to 3D print bulk parts with high fragility from hypoeutectic metallic glass alloys with poor GFA. According to such embodiments, the initial estimated toughness of the hypoeutectic alloys composed according to the criteria of the instant application are selected to be sufficiently high to overcome known 3D printing drawbacks, such as possible annealing embrittlement. Therefore, in many embodiments, the higher fragility, contrary to conventional wisdom, will lead to higher toughness for the bulk amorphous metal parts additively manufactured according to the methods of the instant application, which is, in turn, expected to be much greater than the toughness of any equivalent cast versions. As such, the bulk amorphous metal parts additively manufactured from hypoeutectic alloys according to the methods of the instant application are expected to have the highest toughness of any bulk amorphous alloys.

In many embodiments, the methods of the application can be configured to rely on any 3D process that works with metallic glasses and can achieve per layer cooling rates that are faster than the critical cooling rate for a given BMG alloy. In many such embodiments, the hypoeutectic metal glass forming alloy to be printed is first melted, deposited in a thin layer, and then cooled faster than the alloys critical cooling rate. In many embodiments, the additive manufacturing technique of choice is one of, (but is not limited to): directed energy deposition, such as LENS, thermal spray additive manufacturing, liquid phase printing, direct metal deposition, powder bed fusion such as SLM or DMLS. Alternatively, in other embodiments the metallic glass forming alloy is consolidated during disposition as an amorphous feedstock material that is amorphous and retains the amorphous character and high toughness after disposition. In many embodiments, the layer deposition is affected by either powder injection into a laser, or wire feed into a laser or an electron beam.

In some embodiments, non-melting 3D printing processes may be used to manufacture amorphous bulk parts with a toughness greater than 60 MPa m$^{1/2}$ using hypoeutectic glass materials. In such embodiments, the hypoeutectic feedstock material is a pre-formed metallic glass wire, powder, or ribbon already having the pre-requisite toughness of at least 60 MPa m$^{1/2}$, which is retained throughout the manufacturing process. In many embodiments, non-melting 3D printing processes are selected from a group that includes (but is not limited to): cold spray, binder jetting, ultrasonic additive manufacturing, any combination thereof. Any of the above process may be conducted under an inert gas environment to prevent oxidation of the layers.

Finally, regardless of the process used, the bulk metallic part thus formed may be anything suitable including gears, strain wave gears, knives, cutting tools, bearings, inserts, fasteners, mechanisms, golf clubs, electronic casings, watches, structural coatings, springs, brackets, spacecraft components, and jewelry.

EXEMPLARY EMBODIMENTS

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric.

Figure 12:
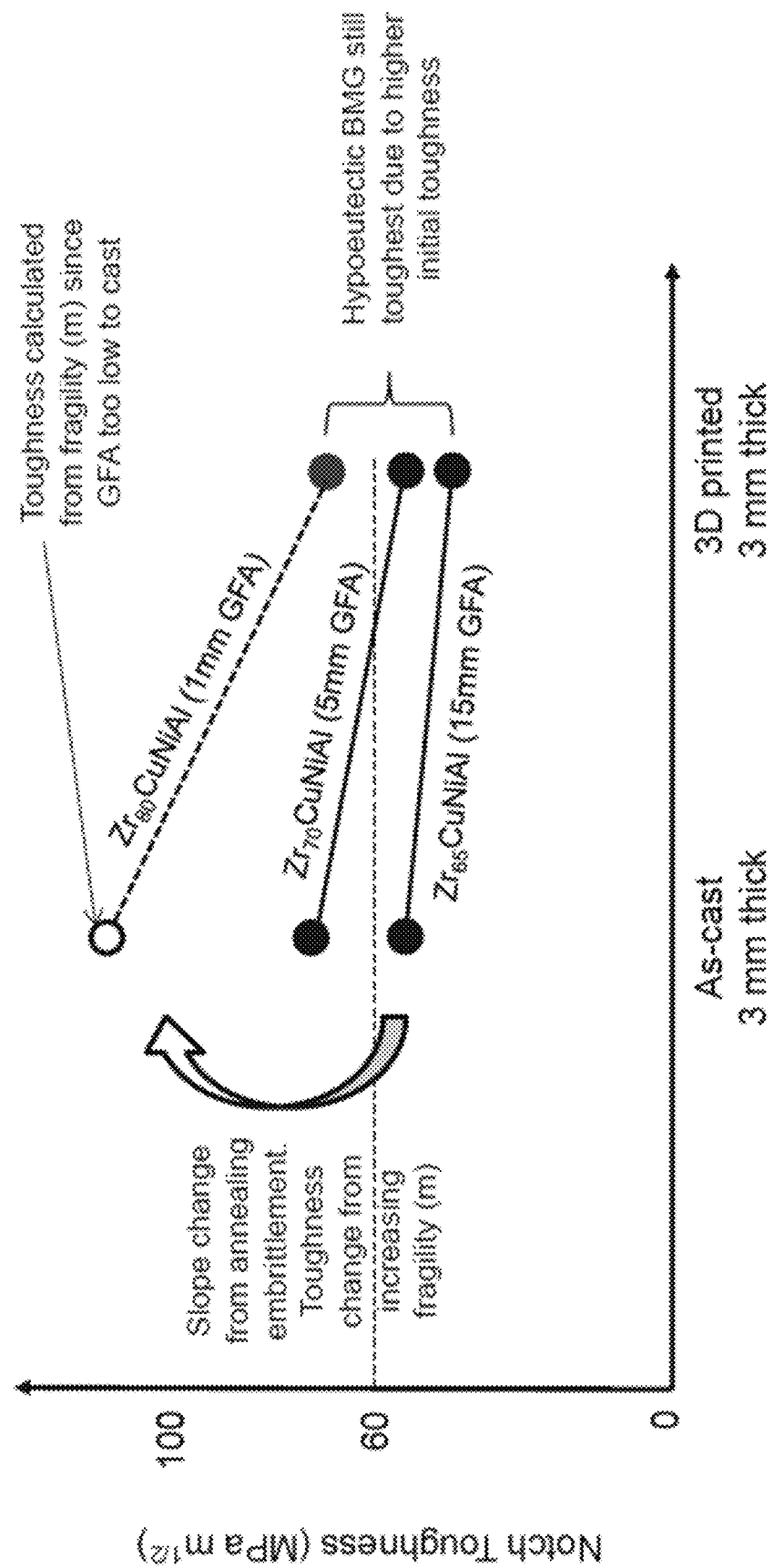
FIG. 12 provides a schematic diagram of the relationship of the notch toughness of metallic glass materials for different forming methods in accordance with embodiments of the invention.

Example 1. Additive Manufacturing of Tough BMG Parts from ZrCuNiAl and Other Alloy Families FIGS. 12 and 13, along with FIG. 3B, illustrate the embodiments and methods of the application in detail, using a well-studied ZrCuNiAl amorphous metal glass family as an example. First, as follows from the table in FIG. 3B, compositions with 65 atomic percent of the main metal Zr, i.e. $Zr_{65}(CuNiAl)_{35}$, are, in general, good glass formers of the family, all with critical rod diameters greater than 1 mm, and even reaching as high as 10 mm or more for the eutectic compositions. In contrast, hypoeutectic $Zr_{70}(CuNiAl)_{30}$ alloys (e.g. $Zr_{70}Ni_{16}Cu_6Al_8$ in FIG. 3B) demonstrate poorer glass forming abilities ($d_c$~5 mm), which are expected to degrade further with increasing Zr content in the composition, to an estimated $d_c$ of ~1 mm for $Zr_{75-80}(CuNiAl)_{25-20}$ (FIG. 12, top plot). However, increasing Zr content will also increase alloy's fragility and toughness (FIG. 12). In turn, increased fragility worsens the alloys' sensitivity to annealing embrittlement during 3D printing. Therefore, in many embodiments, a hypoeutectic alloy, such as $Zr_{70}(CuNiAl)_{30}$ or $Zr_{80}(CuNiAl)_{20}$ or an even higher Zr-content alloy, wherein the alloy is just a barely good enough glass former to be made amorphous by a fast cooling 3D printing process, is selected for manufacturing of a bulk amorphous metal part according to the methods of the application. In summary, using embodiments it is possible to select alloys for 3D printing that are too fragile (i.e., sensitive to annealing embrittlement) for other forming techniques, such as casting, by allowing the deposited layers to cool prior to further deposition, thereby decoupling the annealing from fragility. Accordingly, such bulk parts of the application are expected to demonstrate toughness that is higher than the toughness of their cast equivalents (FIG. 12). In many embodiments the benchmark for the minimal toughness to be obtained from the alloy composition manipulations according to the methods of the application is 60 MPa $m^{1/2}$.

Figure 13:
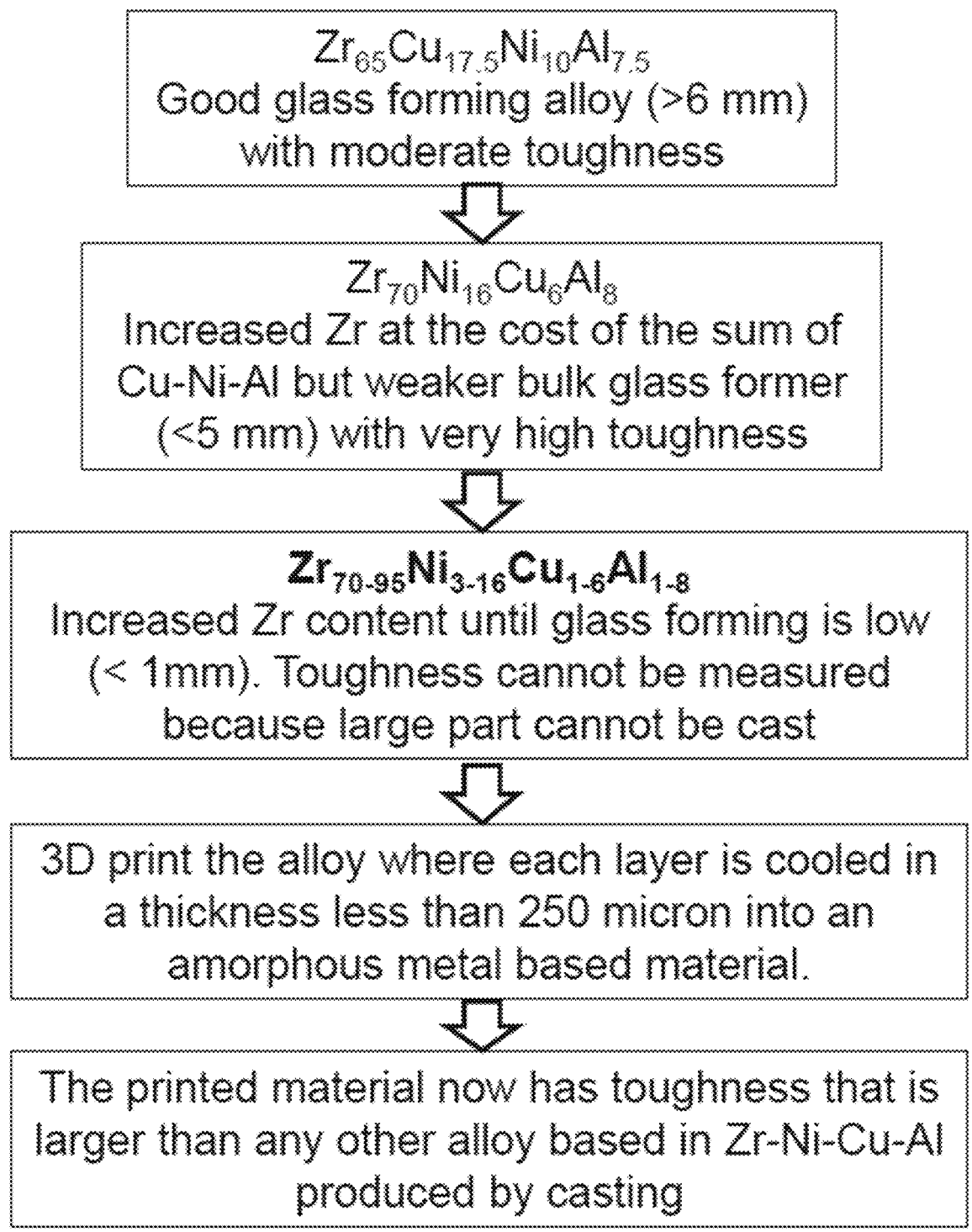
FIG. 13 provides a flow chart of a method for printing a metallic glass material in accordance with embodiments of the invention.

FIG. 13 further details the methods of the instant application using the ZrCuNiAl alloy family as an example. Specifically, in many embodiments, the alloy selection process begins with identification of the eutectic or near-eutectic composition of the alloy family, such that the composition is a known good glass former that can be cast amorphous in a thickness greater than 1 mm. Such good glass former alloys typically have lower fragility and are more brittle. An example of such an alloy composition in the ZrCuNiAl family is $Zr_{65}Cu_{17.5}Ni_{10}Al_{7.5}$, which is a good glass former with a $d_c$ of >6 mm and is of moderate toughness.

Next, in many embodiments, the main metal content (Zr in this example) is increased at the cost of the sum of the remaining elements (Cu—Ni—Al, in this example), leading to a hypoeutectic alloy and a weaker glass former composition ($d_c$<5 mm for $Zr_{70}Cu_6Ni_{16}Al_8$, FIG. 3B), but increased fragility and, therefore, enhanced toughness. Next, in many embodiments, the chosen alloy composition is used in an additive manufacturing process, selected to ensure that each layer is deposited in a thickness of less than 250 microns and is cooled fast enough to produce amorphous material layers, to produce a bulk amorphous metal part with enhanced toughness. Furthermore, in many embodiments, the main metal (e.g. Zr) content is, next, incrementally and iteratively increased within the alloy's composition until the glass formation ability is so low (<1 mm), that it cannot be compensated for by any available additive manufacturing technique's cooling rate. Accordingly, the bulk amorphous part produced from the ZrCuNiAl alloy composition optimized for toughness according to the methods of this application is expected to be tougher than any part cast from (good glass former) alloys of this family. As such, all of the metallic glass alloy compositions that can be described by formula $Zr_{70-95}$ (Cu—Ni—Al—X)$_{5-30}$, wherein X is any metal or non-metal (e.g., metalloid) element that has a composition contribution of less than 10%, are expected to yield bulk amorphous parts of superior toughness when used according to the methods of the instant application.

Similarly, as another example, Zr—Cu family of alloys presented in the table in FIG. 14A can also be used according to the methods of this application to produce bulk metallic glass parts of enhanced toughness. In this alloy family, there is a significant content of two metals (Zr and Cu), both of which can be advantageously manipulated. Therefore, according to the application method instructions provided above, as guided by the table in FIG. 14A data, all of the metallic glass alloy compositions that can be described by the formula $Zr_{62-90}Cu_{10-23}X_{0-28}$, wherein X is any one or more elements, including, but not limited to: Nb, Pd, Al, Ti, Fe, Ag, Co, or any combination thereof, are expected to yield bulk amorphous parts of superior toughness when used according to the methods of the instant application.

As yet another example, Pt families of the alloys presented in the table in FIG. 14B can also be used according to the methods of this application to produce bulk metallic glass parts with enhanced toughness. In these alloy families, the composition content of the main metal Pt must be increased to form a hypoeutectic material in order to improve the alloys' toughness. Therefore, according to the application method instructions provided above, as guided by the data from the table in FIG. 14B, all of the metallic glass alloy compositions that can be described by formulas $Pt_{75-95}CO_{1-20}X_{0-24}$ and $Pt_{75-95}P_{1-20}X_{0-24}$, wherein X is any one or more elements, including, but not limited to: P, B, Si, Ni, Ag, Co, or any combination thereof, are expected to yield bulk amorphous parts of superior toughness when used according to the methods of the instant application. Similarly, all of the following alloy compositions presented in FIGS. 14C through 14I are suitable for use according to the methods of this application to produce bulk metallic glass parts with enhanced toughness: $Pt_{56-70}SiBX$ (based on FIG. 14C), $Pd_{>79}PX$, (FIG. 14D), $Cu_{>60}ZrX$ (FIG. 14E), $Ni_{75-95}BX$ and $Ni_{75-95}PX$ (FIG. 14F), $Fe_{80-95}PX$ and $Fe_{80-95}BX$ (FIGS. 14G and 14H, wherein Fe-based alloys have the additional benefits of low cost and inherent high strength), $Ti_{53-80}ZrX$ and $Ti_{53-80}CuX$ (FIGS. 14I-1 & 14I-2).

Example 2. Improving Toughness of Additively Manufactured Zr-Based BMG Parts

Figure 15:
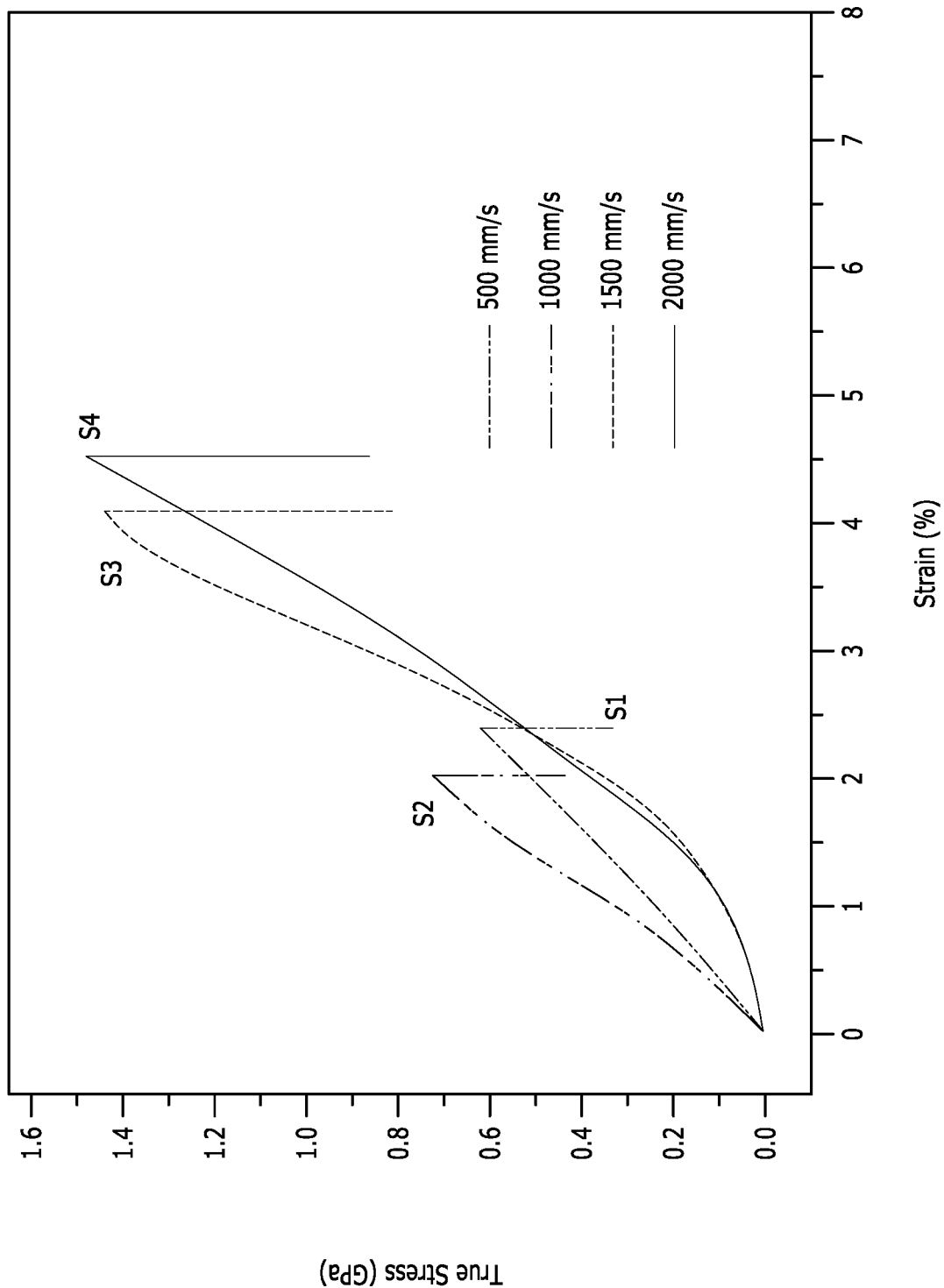
FIG. 15 provides a plot showing the result of printing a metallic glass part according to the prior art.

Bulk amorphous parts have been previously successfully manufactured via 3D printing from the eutectic alloy $Zr_{52.5}Ti_5Cu_{17.9}Ni_{14.6}Al_{10}$ (also known as alloy LM105), which is an excellent glass former. In addition, parts have also been made from the same LM105 alloy via casting, wherein the reported toughness of such cast parts varies from 20-50 MPa $m^{1/2}$. Furthermore, compression tests with the 3D printed parts (shown in FIG. 15) proved that such parts are actually more brittle (have no plasticity) than the equivalent cast parts, despite being printed at a rapid cooling rate, which should have increased the toughness. This is due to the increased oxygen content in the printed alloy and the porosity in the sample. Here, choosing to 3D print bulk amorphous metal parts from alloys of the same Zr-based family, but selected according to the methods of the application to feature increased Zr content, should result in increased fragility and G, and, therefore, much enhanced toughness.

Example 3. Improving Toughness of Additively Manufactured Fe-based BMG Parts

Similarly to Example 2 discussed above, bulk amorphous parts have been previously successfully manufactured via 3D printing using selective laser melting from eutectic Zr-based and Fe-based alloys. (See, e.g., Mahbooba, et al., *Applied Materials Today*, 11 (2018), p 1-6; and Bordeenithikasem, et al., *Additive Manufacturing*, 21 (2018), p 312-317, the disclosures of which are incorporated herein by reference.) These alloys are good glass formers with critical casting thickness of 3 and 4 mm respectively. Furthermore, these examples also show that the alloy with the 74 atomic percent content of Fe has a low notch toughness of 53 MPa m$^{1/2}$ in a cast rod. Although the toughness of the 3D printed parts is not provided, they are expected to be much less tough than their cast equivalents. However, choosing to 3D print bulk amorphous metal parts from alloys of the same Fe-based family, but selected according to the methods of the application to feature increased Fe content (to the point wherein the alloy's glass forming is reduced to ~1 mm), should result in parts with much enhanced toughness.

DOCTRINE OF EQUIVALENTS

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method of producing a layer comprising a bulk amorphous metal material comprising:
   identifying a eutectic metallic glass forming alloy characterized by a eutectic critical casting thickness of greater than 1 mm, a eutectic fragility, and a eutectic shear modulus; and comprising:
      a first amount of a first component and an additional amount of at least one additional component, wherein
         the first component is the most abundant component of the eutectic metallic glass forming alloy, and
         a eutectic exists between the first component and the at least one additional component;
   forming a hypoeutectic metallic glass forming alloy based on the eutectic metallic glass forming alloy by increasing the amount of the first component at the expense of the sum of the additional amount such that the hypoeutectic metallic glass forming alloy has a critical casting thickness less than the eutectic metallic glass forming alloy, a hypoeutectic fragility and a hypoeutectic shear modulus;
      wherein the most abundant component of the hypoeutectic metallic glass forming alloy comprises at least 70 atomic % of the hypoeutectic metallic glass forming alloy;
   depositing a molten layer comprising the hypoeutectic metallic glass forming alloy and characterized by a thickness of between 1-250 micrometers; and
   allowing the molten layer to cool to form the layer comprising the bulk amorphous metal material having an amorphous fraction of at least 10% by volume.

2. The method of claim 1, wherein depositing and allowing to cool comprises heating the hypoeutectic metallic glass forming alloy to above its melting temperature and then cooling the molten layer at an initial cooling rate faster than 1,000 K/s.

3. The method of claim 1, wherein depositing comprises a technique selected from the group consisting of: powder bed fusion, directed energy deposition, electron beam melting, wire-fed melting, fused deposition modeling, thermal spray additive manufacturing, laser foil printing, molten metal printing, ultrasonic additive manufacturing, and drop on demand printing.

4. The method of claim 1, wherein the hypoeutectic fragility is at least 5% higher, as measured through differential scanning calorimetry, than the eutectic fragility.

5. The method of claim 1, wherein the hypoeutectic critical casting thickness is less than 1 mm.

6. The method of claim 1, wherein the hypoeutectic shear modulus is at least 5% lower than the eutectic shear modulus.

7. The method of claim 1, wherein the most abundant component of the hypoeutectic metallic glass forming alloy is at least 5% more than the first amount.

8. The method of claim 1, wherein depositing and allowing to cool is conducted under an inert gas.

9. The method of claim 1, wherein the hypoeutectic metallic glass forming alloy is combined with a crystalline phase to form a composite which, when deposited and allowed to cool, alters the fracture toughness of the bulk amorphous metal material as compared to a material in the layer formed using the eutectic metallic glass forming alloy.

10. The method of claim 9, wherein the hypoeutectic metallic glass forming alloy and the crystalline phase are provided in the form of powders with a size distribution within 10% of each other.

11. The method of claim 9, wherein the hypoeutectic metallic glass forming alloy and the crystalline phase have different melting temperatures, such that during depositing the hypoeutectic metallic glass forming alloy melts and the crystalline phase at most partially melts.

12. The method of claim 1, wherein the notch toughness of the layer is at least 60 MPa m$^{1/2}$ as measured on a notched 3 mm thick sample using standard three-point-bending toughness measurements with a 100 micrometer root radius notch.

13. The method of claim 1, wherein the first component is Zr.

14. The method of claim 1, wherein the hypoeutectic metallic glass forming alloy comprises Zr—Cu—Ni—Al components, and the corresponding concentrations of these components in atomic percentages are: zirconium 70-85 at %, nickel 5-15 at. %, copper 1-5 at. %, and Al 2-7 at. %.

15. The method of claim 1, wherein the hypoeutectic metallic glass forming alloy comprises a component system selected from the group consisting of: Zr—Cu—Al—X, Zr—Al—X, Pt—Cu—P—X, Pt—P—X, Pt—Si—B—X, Pd—P—X, Ni—Ti—Zr—X, Fe—P—X, Fe—B—X, Ti—Zr—X, Ti—Cu—X, wherein X represents one or more optional additional elements.

16. The method of claim 1, wherein the hypoeutectic metallic glass forming alloy is characterized by one or more criteria selected from the group consisting of: comprises at least 77 at. % of platinum, comprises at least 80 at % of palladium, comprises at least 75 at. % of nickel, comprises at least 80 at. % of iron, comprises at least 80 at % of gold, comprises at least 88 at. % of aluminum.

17. The method of claim 1, wherein the hypoeutectic fragility is at least 50.

18. The method of claim 1, wherein the amount of the most abundant component of hypoeutectic metallic glass forming alloy is larger than the first amount at the expense of the amounts of those additional components of the eutectic metallic glass forming alloy that are metals found to the right of the first component on the periodic table.

19. The method of claim 1, wherein the layer comprising the bulk amorphous metal material is applied to a part or item selected from the group consisting of: gear, strain wave gear, knife, cutting tool, bearing, insert, fastener, mechanism, golf club, electronic casing, watch, structural coating, spring, bracket, spacecraft component, and jewelry.

* * * * *